(12) United States Patent
Mochizuki et al.

(10) Patent No.: US 10,035,431 B2
(45) Date of Patent: Jul. 31, 2018

(54) ELECTRIC VEHICLE

(71) Applicant: YAMAHA HATSUDOKI KABUSHIKI KAISHA, Iwata-shi, Shizuoka (JP)

(72) Inventors: Toshiki Mochizuki, Shizuoka (JP); Hisashi Murase, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 0 days.

(21) Appl. No.: 15/666,600

(22) Filed: Aug. 2, 2017

(65) Prior Publication Data

US 2017/0327004 A1  Nov. 16, 2017

(30) Foreign Application Priority Data

Aug. 3, 2016 (JP) ................. 2016-153164

(51) Int. Cl.
| | |
|---|---|
| *B60L 9/00* | (2006.01) |
| *B60L 15/20* | (2006.01) |
| *B62K 23/02* | (2006.01) |
| *H04R 3/04* | (2006.01) |
| *B60W 10/08* | (2006.01) |
| *B62K 11/04* | (2006.01) |
| *B62M 9/02* | (2006.01) |

(52) U.S. Cl.
CPC .......... *B60L 15/20* (2013.01); *B60L 15/2045* (2013.01); *B60W 10/08* (2013.01); *B62K 23/02* (2013.01); *H04R 3/04* (2013.01); *B60L 2200/12* (2013.01); *B60L 2240/42* (2013.01); *B60L 2240/421* (2013.01); *B60L 2260/26* (2013.01); *B60L 2270/145* (2013.01); *B62K 11/04* (2013.01); *B62K 2204/00* (2013.01); *B62K 2208/00* (2013.01); *B62M 9/02* (2013.01); *G10H 2250/381* (2013.01); *H04R 2499/13* (2013.01)

(58) Field of Classification Search
USPC .......................................... 701/22
See application file for complete search history.

(56) References Cited

U.S. PATENT DOCUMENTS

2007/0278022 A1  12/2007  Tanishima
2010/0087287 A1  4/2010  Tabata et al.
(Continued)

FOREIGN PATENT DOCUMENTS

EP  1 859 982 A2  11/2007

*Primary Examiner* — Tyler Paige
(74) *Attorney, Agent, or Firm* — Keating and Bennett, LLP

(57) ABSTRACT

An electric vehicle includes front and rear wheels, a battery, an electric motor that drives at least one of the front and rear wheels, an accelerator, and a mode shift operator that is operated by a user in order to switch drive modes. The electric vehicle includes a driving force characteristics setter that sets, for each of the plurality of drive modes, driving force characteristics which are characteristics of an accelerator opening degree and a target motor driving force for the rotational speed of the electric motor. The electric vehicle further includes a controller which shifts up, according to an operation of the mode shift operator, the drive mode from a first drive mode to a second drive mode and which controls the target motor driving force according to the driving force characteristics. When a shift-down prohibition condition is met, the controller prohibits a shift down from the second drive mode to the first drive mode.

21 Claims, 12 Drawing Sheets

(56) References Cited

U.S. PATENT DOCUMENTS

| | | |
|---|---|---|
| 2013/0184922 A1 | 7/2013 | Kabe |
| 2013/0261858 A1 | 10/2013 | Higashitani et al. |
| 2014/0309829 A1* | 10/2014 | Higashitani ............. B60L 15/20 |
| | | 701/22 |
| 2015/0127200 A1* | 5/2015 | Takeuchi .............. B60W 10/04 |
| | | 701/22 |

* cited by examiner

ELECTRIC VEHICLE

CROSS REFERENCE TO RELATED APPLICATIONS

This application claims the benefit of priority to Japanese Patent Application No. 2016-153164 filed on Aug. 3, 2016. The entire contents of this application are hereby incorporated herein by reference.

BACKGROUND OF THE INVENTION

1. Field of the Invention

The present invention relates to an electric vehicle which includes an electric motor that drives at least one of front and rear wheels.

2. Description of the Related Art

An example of an electric vehicle is disclosed in US 2013/0261858 A1. The electric vehicle includes a running motor and an electronic control unit (ECU) which controls the running motor. The electric vehicle has a plurality of running modes which can be switched.

The plurality of running modes are specifically a normal mode, an economy mode, and a sports mode. The normal mode is a standard running mode. The economy mode is a running mode in which mileage per unit power consumption, that is, power efficiency is prioritized. The sports mode is a running mode in which the output response of the vehicle is prioritized. Vehicle speed upper limit values Vmax1, Vmax2, and Vmax3 which respectively correspond to the normal mode, the economy mode, and the sports mode are predetermined. A magnitude relationship thereof is Vmax3>Vmax1>Vmax2.

The electronic control unit performs normal control for controlling the running motor according to the running mode which has been set. The normal control is a control in which the vehicle speed upper limit value is set according to the current running mode and in which a target driving force is changed such that the vehicle speed becomes equal or substantially equal to the vehicle speed upper limit value. On the other hand, when the running mode is switched from the sports mode to the normal mode or the economy mode, the electronic control unit performs vehicle speed gradual decrease control. The vehicle speed gradual decrease control is a control in which the vehicle speed upper limit value is gradually decreased from the vehicle speed upper limit value (Vmax3) in the running mode before the switching to the vehicle speed upper limit value (Vmax1 or Vmax2) in the running mode after the switching. Accordingly, the vehicle speed gradually decreases, and thus it is possible to prevent an abrupt change in the vehicle speed when the running mode is switched.

SUMMARY OF THE INVENTION

The inventor of preferred embodiments of the present invention described and claimed in the present application conducted an extensive study and research regarding an electric vehicle, such as the one described above, and in doing so, discovered and first recognized new unique challenges and previously unrecognized possibilities for improvements as described in greater detail below.

A state is assumed where, in the running mode (the sports mode) whose vehicle speed upper limit value is high, an accelerator is fully opened such that the vehicle runs at a vehicle speed close to the vehicle speed upper limit value. When in this running state, the running mode is switched to the running mode (the normal mode or the economy mode) whose vehicle speed is low, although the accelerator is fully opened, the vehicle speed gradually decreases. Such a behavior does not occur in a vehicle whose drive source is an internal-combustion engine (vehicle including an engine). Therefore, there is a possibility that a user, especially who is accustomed to a vehicle including such an engine, experiences an unfamiliar running feeling and thus feels that riding comfort is not satisfactory.

In order to overcome the previously unrecognized and unsolved challenges described above, preferred embodiments of the present invention provide an electric vehicle that includes front and rear wheels, a battery, an electric motor that uses power supplied from the battery so as to drive at least one of the front and rear wheels, an accelerator that is operated by a user in order to adjust the driving force of the electric motor, a mode shift operator that is operated by the user in order to switch a plurality of drive modes which are different in the upper limit rotational speed or rotational frequency of the electric motor, a driving force characteristics setter, and a controller. The driving force characteristics setter sets, for each of the plurality of drive modes including a first drive mode in which a first upper limit rotational speed is set and a second drive mode in which a second upper limit rotational speed larger than the first upper limit rotational speed is set, driving force characteristics which are characteristics of a target motor driving force with respect to an accelerator opening degree that is the amount of operation of the accelerator and the rotational speed of the electric motor. The controller is configured or programmed to shift up, according to the operation of the mode shift operator, the drive mode of the electric motor from the first drive mode to the second drive mode, to acquire the accelerator opening degree and the rotational speed of the electric motor, and to control the target motor driving force according to the driving force characteristics set by the driving force characteristics setter. When a predetermined first shift-down prohibition condition is met, the controller prohibits a shift down from the second drive mode to the first drive mode.

The shift up refers to the change of the drive mode to a drive mode in which the upper limit rotational speed is higher than the current drive mode. The shift down refers to the change of the drive mode to a drive mode in which the upper limit rotational speed is lower than the current drive mode.

According to this arrangement, a user operates the accelerator and to adjust the driving force of the electric motor, and operates the mode shift operator to switch the drive mode of the electric motor. The setting of the target motor driving force in each drive mode is made according to the driving force characteristics set by the driving force characteristics setter. That is, in each drive mode, the target motor driving force is determined according to the accelerator opening degree and the rotational speed of the electric motor. The controller shifts up from the first drive mode to the second drive mode according to the operation of the mode shift operator. On the other hand, the controller prohibits the shift down from the second drive mode to the first drive mode when the first shift-down prohibition condition is met.

By appropriately determining the first shift-down prohibition condition, it is possible to appropriately perform or limit the shift down. It is thus possible to prevent degradation of the riding comfort caused by the shift down, and thus it is possible to realize vehicle characteristics that provide a satisfactory riding comfort. For example, it is possible to realize vehicle characteristics providing satisfactory riding comfort for a user who is accustomed to a vehicle including an engine.

In a preferred embodiment of the present invention, the first shift-down prohibition condition includes at least one of a prohibited accelerator-opening-degree condition in which the accelerator opening degree is equal to or more than a predetermined fully open determination threshold value, a prohibited rotational speed condition in which the rotational speed of the electric motor is equal to or more than a predetermined upper limit determination threshold value, and a jump condition in which the electric vehicle is jumping.

In a case where the first shift-down prohibition condition includes the prohibited accelerator-opening-degree condition, if the accelerator opening degree is equal to or more than the fully open determination threshold value, the shift down from the second drive mode to the first drive mode is prohibited. Therefore, when the accelerator is fully opened or the accelerator opening degree is close thereto, the upper limit rotational speed of the electric motor does not change from the second upper limit rotational speed to the first upper limit rotational speed lower than the second upper limit rotational speed. Therefore, in a state close to the fully opened accelerator, the rotational speed of the electric motor does not decrease, and thus an unfamiliar running feeling is not provided to the user who is accustomed to an engine vehicle, with the result that it is possible to realize vehicle characteristics of satisfactory riding comfort.

In a case where the first shift-down prohibition condition includes the prohibited rotational speed condition, when the rotational speed of the electric motor is equal to or more than the predetermined upper limit determination threshold value, the shift down to the first drive mode is prohibited. The upper limit determination threshold value may be equal to the second upper limit rotational speed or may be a value (a value smaller than the second upper limit rotational speed) close to the second upper limit rotational speed. When the rotational speed of the electric motor is a value close to the second upper limit rotational speed, the accelerator may be regarded as the fully opened accelerator or as having the accelerator opening degree close thereto. Therefore, in the state close to the fully opened accelerator, the rotational speed of the electric motor does not decrease, and thus an unfamiliar running feeling is not given to the user who is accustomed to a vehicle including an engine, with the result that it is possible to realize the vehicle characteristics of satisfactory riding comfort.

In a case where the first shift-down prohibition condition includes the jump condition, when the vehicle is jumping, the shift down to the first drive mode is prohibited. During jumping, the vehicle is performing a free movement in the air, and thus the vehicle speed is equal or substantially equal to that before jumping. Therefore, after jumping is completed and the vehicle lands, by keeping the same drive mode as before jumping, it is possible to provide the running characteristics of satisfactory riding comfort to the user.

In particular, in a case where auto-shift down from the second drive mode to the first drive mode is performed according to the accelerator opening degree and/or the rotational speed of the electric motor, it is beneficial to provide the jump condition. Otherwise, the user needs to perform an operation of keeping the accelerator opening degree close to the fully opening even during jumping and thus maintain the second drive mode. When the drive mode is automatically shifted down to the first speed mode without performing such an operation, the user needs to perform the shift-up operation after landing so as to return to the drive mode before jumping. When the accelerator opening degree is kept close to the fully opening in the air, the electric motor rotates at a high speed, with the result that there is also a possibility that it becomes difficult to control the posture of the electric vehicle in the air.

In a preferred embodiment of the present invention, when in the second drive mode, and the first shift-down prohibition condition is not met and a predetermined shift-down execution condition is met, the controller is configured or programmed to perform the shift down from the second drive mode to the first drive mode.

According to this arrangement, when the first shift-down prohibition condition is not met and if the shift-down execution condition is met, the drive mode is automatically shifted down from the second drive mode to the first drive mode. Therefore, it is possible to appropriately perform the shift down without degradation of riding comfort of the electric vehicle.

In a preferred embodiment of the present invention, when in the second drive mode and a shift-down command to shift down to the first drive mode with the mode shift operator is input, on the condition that the first shift-down prohibition condition is not met and that a predetermined shift-down execution condition is met, the controller is configured or programmed to perform the shift down from the second drive mode to the first drive mode.

According to this arrangement, even when the shift-down operation on the mode shift operator is performed, only with that fact, the shift down from the second drive mode to the first drive mode is not performed. That is, it is necessary that the first shift-down prohibition condition is not met and that the shift-down execution condition is met. Accordingly, even when the user performs the shift-down operation, the shift down is performed under the appropriate conditions. It is thus possible to improve riding comfort at the time of the shift down.

In a preferred embodiment of the present invention, when in the second drive mode and the shift-down command to shift down to the first drive mode with the mode shift operator is input, in a case where the first shift-down prohibition condition is met or the shift-down execution condition is not met, the controller is configured or programmed to withhold receiving of the shift-down command and to stand by until the shift-down prohibition condition is not met and the shift-down execution condition is met.

According to this arrangement, when the shift-down operation is performed on the mode shift operator, if the first shift-down prohibition condition is met or the shift-down execution condition is not met, the receiving of the shift-down command is withheld. Then, when the first shift-down prohibition condition is met and the shift-down execution condition is not met, the shift down is performed. Therefore, the user does not need to perform the shift-down operation again. Thus, the user is able to provide the shift-down command with arbitrary timing, and the actual shift down is performed under the appropriate conditions. It is thus possible to provide a vehicle in which the shift-down operation is easily performed and in which satisfactory riding comfort is provided at the time of the shift down.

In a preferred embodiment of the present invention, the shift-down execution condition includes an execution rotational speed condition in which the rotational speed of the electric motor is equal to or less than a shift-down execution rotational speed that is equal to or less than the second upper limit rotational speed (more preferably, equal to or less than the first upper limit rotational speed).

Due to this arrangement, the shift down is not allowed until the rotational speed of the electric motor is equal to or less than the shift-down execution rotational speed. Therefore, the shift down is allowed when a difference between the rotational speed of the electric motor and the first upper limit rotational speed (the upper limit rotational speed in the first drive mode) is small or the rotational speed of the electric motor is equal to or less than the first upper limit rotational speed. The rotational speed of the electric motor thus does not significantly decrease due to the shift down, and thus it is possible to provide a vehicle in which satisfactory riding comfort is provided at the time of the shift down.

In a preferred embodiment of the present invention, the shift-down execution condition includes an execution accelerator-opening-degree condition in which the accelerator opening degree is equal to or less than a shift-down execution opening degree that is equal to or less than the fully open determination threshold value.

Due to this arrangement, the shift down is not allowed until the accelerator opening degree is equal to or less than the shift-down execution opening degree. Therefore, the shift down is allowed when the accelerator opening degree is small to some degree, and accordingly, a difference between the rotational speed of the electric motor and the first upper limit rotational speed is small or the rotational speed of the electric motor is equal to or less than the first upper limit rotational speed. The rotational speed of the electric motor thus does not significantly decrease due to the shift down, and thus it is possible to provide an electric vehicle in which satisfactory riding comfort is provided at the time of the shift down.

When the execution accelerator-opening-degree condition is not met, the shift down is prohibited, and thus the prohibited accelerator-opening-degree condition may be omitted. To the contrary, the fact that the execution accelerator-opening-degree condition is not met, that is, that the accelerator opening degree is larger than the shift-down execution opening degree is set to the prohibited accelerator-opening-degree condition, and thus the execution accelerator-opening-degree condition may be omitted.

In a preferred embodiment of the present invention, the shift-down execution condition includes a condition in which an execution rotational speed condition in which the rotational speed of the electric motor is equal to or less than a shift-down execution rotational speed that is equal to or less than the second upper limit rotational speed and an execution accelerator-opening-degree condition in which the accelerator opening degree is equal to or less than a shift-down execution opening degree that is equal to or less than the fully open determination threshold value are met continuously for a predetermined time.

According to this arrangement, the shift down is not allowed unless the rotational speed of the electric motor is equal to or less than the shift-down execution rotational speed, the accelerator opening degree is equal to or less than the shift-down execution opening degree, and this state continues for the predetermined time. The shift down is thus allowed when the accelerator is not fully opened and the rotational speed of the electric motor is close to the first upper limit rotational speed or is stable in a state where the rotational speed of the electric motor is equal to or less than the first upper limit rotational speed. Therefore, it is possible to reliably prevent a significant decrease in the rotational speed of the electric motor associated with the shift down, and thus it is possible to provide an electric vehicle in which riding comfort at the time of the shift down is enhanced.

When the execution rotational speed condition is not met, the shift down is prohibited, and thus the prohibited rotational speed condition may be omitted. In other words, the fact that the execution rotational speed condition is not met, that is, that the rotational speed of the electric motor is larger than the shift-down execution rotational speed may be regarded as the prohibited rotational speed condition.

When the execution accelerator-opening-degree condition is not met, the shift down is prohibited, and thus the prohibited accelerator-opening-degree condition may be omitted. In other words, the fact that the execution accelerator-opening-degree condition is not met, that is, that the accelerator opening degree is larger than the shift-down execution opening degree may be regarded as the prohibited accelerator-opening-degree condition.

In a case where the first shift-down prohibition condition does not include the jump condition, the fact that the shift-down execution condition is not met may be set to the first shift-down prohibition condition. In this case, when the shift-down execution condition is not met, the first shift-down prohibition condition is met, and thus the shift down from the second drive mode to the first drive mode is prohibited.

In a preferred embodiment of the present invention, the driving force characteristics of the first drive mode and the second drive mode include a common characteristics zone in which equal characteristics are set in a low speed zone lower than the first upper limit rotational speed.

According to this arrangement, in the low speed zone, the common characteristics zone in which the first drive mode and the second drive mode have equal or substantially equal characteristics is provided. Therefore, as the rotational speed of the electric motor decreases, the driving force characteristics in the first and second drive modes are approximated, with the result that it is possible to prevent changes in the driving force characteristics associated with the shift down. In particular, in a case where the shift-down prohibition condition includes the execution rotational speed condition, the shift down is prohibited in the rotational speed zone where a large gap is present between the driving force characteristics, with the result that the shift down is performed in the common characteristics zone or the rotational speed zone close thereto. Therefore, it is possible to further enhance riding comfort at the time of the shift down.

In a preferred embodiment of the present invention, the plurality of drive modes further include a third drive mode in which a third upper limit rotational speed larger than the second upper limit rotational speed is set, and the controller is configured or programmed to shift up, according to the operation of the mode shift operator, the drive mode of the electric motor from the second drive mode to the third drive mode, and to prohibit a shift down from the third drive mode to the second drive mode when a predetermined second shift-down prohibition condition is met.

According to this arrangement, it is possible to switch the drive modes among the first, second, and third drive modes. When the second shift-down prohibition condition is met, the shift down from the third drive mode to the second drive mode is prohibited. Therefore, by appropriately determining the second shift-down prohibition condition, it is possible to appropriately perform or limit the shift down. It is thus possible to prevent degradation of riding comfort caused by the shift down, and thus it is possible to realize the vehicle characteristics of satisfactory riding comfort. For example, it is possible to realize the vehicle characteristics of satisfactory riding comfort for a user who is accustomed to a vehicle including an engine.

In a preferred embodiment of the present invention, the electric vehicle further includes a shift input acceptance/rejection operator which is operated by a user in order to switch between a state where the shift command input by the mode shift operator is enabled and a state where the shift command input by the mode shift operator is disabled.

According to this arrangement, it is possible to select the enabling/disabling of the operation of the mode shift operator. In other words, it is possible to select the enabling/disabling of the manual shift up and/or the manual shift down. The shift command input by the mode shift operator is disabled, and thus the shift up and/or the shift down (shift change) is performed by the automatic control, with the result that it is possible to provide an electric vehicle in which riding comfort at the time of the shift change is enhanced. On the other hand, the command input by the mode shift operator is enabled, and thus it is possible to realize the shift change corresponding to the intention of the user and to appropriately allow or limit the shift down by the shift-down prohibition condition. It is thus possible to provide an electric vehicle without degradation of riding comfort even at the time of the manual shift change.

In a preferred embodiment of the present invention, the electric vehicle further includes a running sound characteristics setter which sets a plurality of running sound characteristics that are characteristics of a running sound for the rotational speed of the electric motor according to the plurality of drive modes, a running sound generator which produces the running sound, and a running sound controller configured or programmed to control the running sound generator according to the running sound characteristics corresponding to the drive mode among the plurality of running sound characteristics set by the running sound characteristics setter and according to the rotational speed of the electric motor, and to cause the running sound generator to emit a sound. The plurality of running sound characteristics set by the running sound characteristics setter include first running sound characteristics corresponding to the first drive mode and second running sound characteristics corresponding to the second drive mode that are different from the first running sound characteristics.

According to this arrangement, the running sound corresponding to the drive mode and the rotational speed of the electric motor is produced from the running sound generator. The user is able to perform the accelerator operation and the mode shift operation while recognizing the drive mode and the rotational speed of the electric motor. Therefore, the accelerator operation and the mode shift operation are appropriately performed, and thus it is possible to provide an electric vehicle which is easy to operate and which has satisfactory riding comfort.

In a preferred embodiment of the present invention, in the first upper limit rotational speed, the running sound corresponding to the first running sound characteristics and the running sound corresponding to the second running sound characteristics are different from each other.

According to this arrangement, the different running sounds are produced according to the drive modes, and thus the user is able to reliably recognize the current drive mode. The user thus appropriately and easily performs the accelerator operation and the mode shift operation, with the result that it is possible to provide an electric vehicle which is easy to operate and which has satisfactory riding comfort.

In a preferred embodiment of the present invention, the plurality of drive modes further include a third drive mode in which a third upper limit rotational speed larger than the second upper limit rotational speed is set, the plurality of running sound characteristics set by the running sound characteristics setter include third running sound characteristics which correspond to the third drive mode and which are different from both the first running sound characteristics and the second running sound characteristics and in the first upper limit rotational speed, the running sound corresponding to the third running sound characteristics is different from both the running sound corresponding to the first running sound characteristics and the running sound corresponding to the second running sound characteristics.

According to this arrangement, the different running sounds are produced according to the first drive mode, the second drive mode, and the third drive mode, and thus the user is able to reliably distinguish and recognize the current drive mode. The user thus appropriately and easily performs the accelerator operation and the mode shift operation, and thus it is possible to provide an electric vehicle which is easy to operate and which has satisfactory riding comfort.

In a preferred embodiment of the present invention, the running sound controller is configured or programmed to control the running sound generator such that when the drive mode is changed, the running sound is changed discontinuously according to the switching of the drive modes.

According to this arrangement, when the drive modes are switched, the running sound becomes discontinuous. Therefore, the user is able to easily recognize the switching of the drive modes. Therefore, the user is able to recognize the current state of the electric vehicle in a timely manner, and thus it is possible to provide an electric vehicle which is easy to operate and which has satisfactory riding comfort.

In a preferred embodiment of the present invention, the running sound characteristics include, for predetermined elemental data of the running sound, a characteristic that changes according to the rotational speed of the electric motor, and the elemental data corresponding to the first upper limit rotational speed in the first running sound characteristics and the elemental data corresponding to the second upper limit rotational speed in the second running sound characteristics are equal or substantially equal to each other.

The elemental data refers to data which define the elements of the running sound such as the frequency (pitch), the volume, the sound quality, and the sound emission pattern (the sound emission interval of the same sound, the pattern of change of sound and the like).

The running sound data has common elemental data in the first upper limit rotational speed and the second upper limit rotational speed, and thus the user easily recognizes the upper limit rotational speed in each drive mode. That is, when in each drive mode, the running sound that has the common elemental data is produced, the user is able to recognize that the upper limit rotational speed in the drive mode is reached. The user thus appropriately and easily performs the accelerator operation and the mode shift operation, and thus it is possible to provide an electric vehicle which is easy to operate and which has satisfactory riding comfort.

In a preferred embodiment of the present invention, the running sound characteristics are predetermined such that the predetermined elemental data increases as the rotational speed of the electric motor increases.

As the rotational speed of the electric motor increases, the predetermined elemental data (for example, the frequency or the volume of the running sound) increases, and when the upper limit rotational speed in each drive mode is reached, the elemental data becomes the common value in the first and second drive modes. Accordingly, the user is able to recognize the rotational speed of the electric motor from the running sound, and thus appropriately performs the accelerator operation and the mode shift operation. Thus, it is possible to provide an electric vehicle which is easy to operate and which has satisfactory riding comfort.

In a preferred embodiment of the present invention, in the first running sound characteristics, in a first upper limit rotational speed zone set in the vicinity of the first upper limit rotational speed, the elemental data is saturated at the maximum value, and in the second running sound characteristics, in a second upper limit rotational speed zone set in the vicinity of the second upper limit rotational speed, the elemental data is saturated at the maximum value.

According to this arrangement, in each drive mode, the elemental data of the running sound increases as the rotational speed of the electric motor increases, and the elemental data is saturated in the upper limit rotational speed zone. The user is able to recognize the rotational speed of the electric motor and reliably recognize that the rotational speed of the electric motor is close to the upper limit rotational speed in each mode. Therefore, the user is able to appropriately perform the accelerator operation and the mode shift operation. Thus, it is possible to provide an electric vehicle which is easy to operate and which has satisfactory riding comfort.

In a preferred embodiment of the present invention, the driving force characteristics set by the driving force characteristics setter for each of the plurality of drive modes include power running characteristics which are applied when the electric motor is accelerated and regeneration characteristics which are applied when the electric motor is decelerated, and the regeneration characteristics are characteristics that determine a target regeneration force corresponding to the rotational speed of the electric motor as a target motor driving force.

According to this arrangement, when the electric motor is accelerated, the target motor driving force is determined according to the power running characteristics whereas when the electric motor is decelerated, the target motor driving force is determined according to the regeneration characteristics. It is thus possible to appropriately perform acceleration and the deceleration, and thus it is possible to provide an electric vehicle which has satisfactory riding comfort. When the predetermined first shift-down prohibition condition is met, the shift down from the second drive mode to the first drive mode is prohibited. The shift down is thus appropriately performed, and thus it is possible to provide an electric vehicle which has satisfactory riding comfort when the electric motor is decelerated, that is, even when the regeneration operation is performed.

In a preferred embodiment of the present invention, the regeneration characteristics for the first and second drive modes are predetermined such that, at an arbitrary rotational speed of the electric motor within a predetermined rotational speed zone, a regeneration force in the first drive mode becomes larger than a regeneration force in the second drive mode.

Within the predetermined rotational speed zone, the regeneration force in the first drive mode is larger than the regeneration force in the second drive mode, and thus the electric motor is swiftly decelerated in the first drive mode. Therefore, by limiting the shift down by the first shift-down prohibition condition, it is possible to prevent an abrupt increase in the degree of deceleration. It is thus possible to provide an electric vehicle which has satisfactory riding comfort.

In a preferred embodiment of the present invention, the electric vehicle further includes a mechanical clutch which connects/blocks a driving force transmission path between the electric motor and the front and rear wheels and a clutch operator which is operated by a user in order to operate the mechanical clutch.

According to this arrangement, a user operates the clutch operator to operate the mechanical clutch, and selects the use/stop of the driving force of the electric motor. The degree of freedom of operating is thus enhanced, and thus it is possible to provide an electric vehicle which is easy to operate and which has satisfactory riding comfort accordingly. In particular, in a case where the running sound corresponding to the rotational speed of the electric motor and the drive mode is produced, it is possible to appropriately perform the clutch connection operation and the shift operation, with the result that it is possible to provide an electric vehicle which is easy to operate and which has satisfactory riding comfort accordingly.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
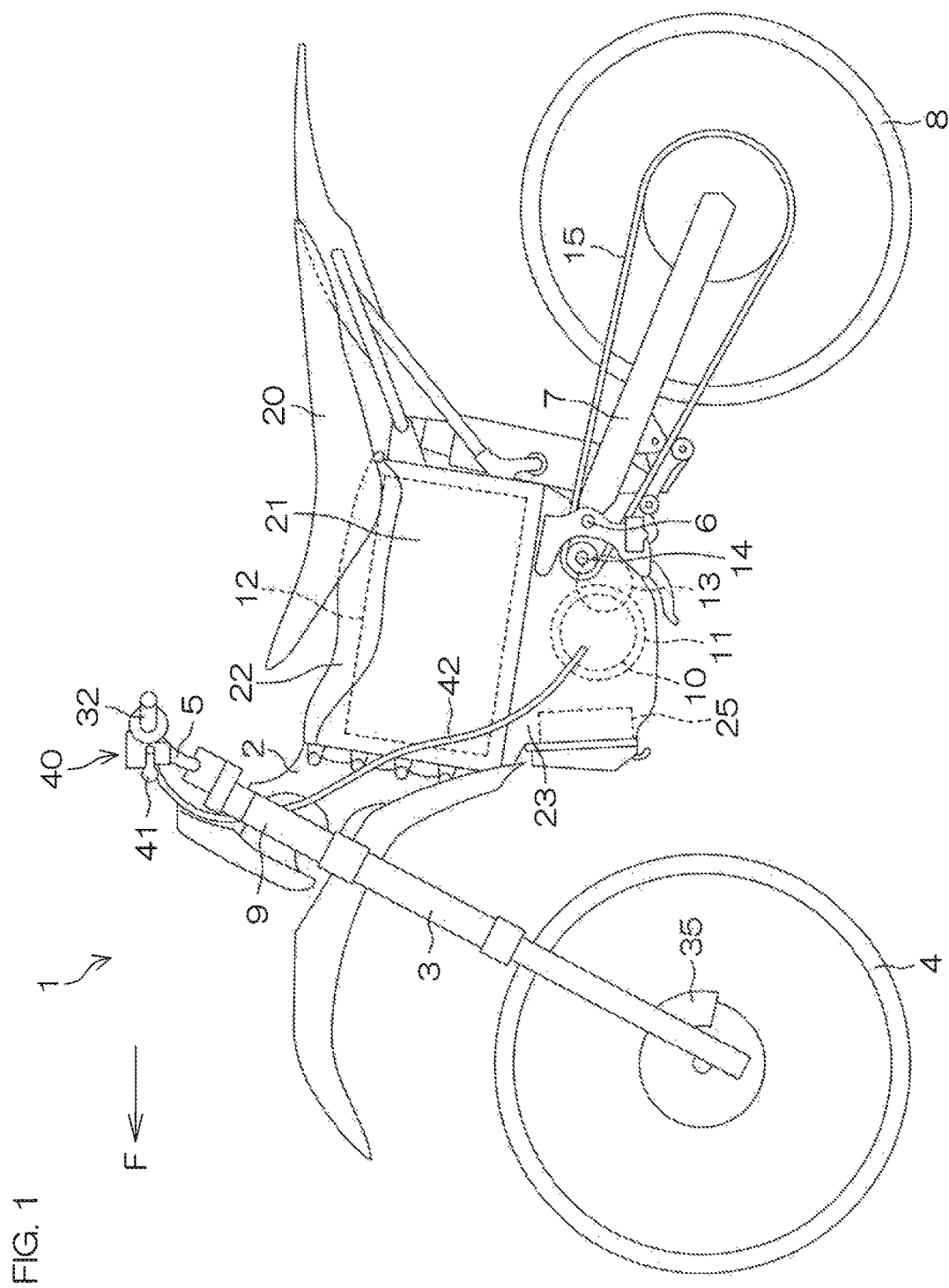
FIG. 1 is a left side view of an electric vehicle according to a preferred embodiment of the present invention.

FIG. 1 is a left side view of an electric vehicle 1 according to a preferred embodiment of the present invention. In this preferred embodiment, the electric vehicle 1 is, for example, a straddled electric vehicle, and is an electric motorcycle in this preferred embodiment. An arrow F indicates the forward direction of the electric vehicle 1. In the following description, upward and downward directions, forward and rearward directions, and leftward and rightward directions are defined with reference to the viewpoint of a rider (user) who straddles the electric vehicle 1 while facing forward.

The electric vehicle 1 includes, for example, a monocoque-type vehicle body frame 2, a front fork 3, a front wheel 4, a steering handle 5, a swing arm 7, and a rear wheel 8. The vehicle body frame 2 includes a head pipe 9 in its front portion. The front fork 3 is supported by the head pipe 9 such that the front fork 3 is able to rotate in the leftward and rightward directions. The front wheel 4 is supported by a lower portion of the front fork 3. The steering handle 5 is coupled to an upper portion of the front fork 3. In the lower portion of the vehicle body frame 2, a pivot shaft 6 is provided. The swing arm 7 is supported by the pivot shaft 6 such that the swing arm 7 is able to swing in the upward and downward directions. The rear wheel 8 is supported by a rear portion of the swing arm 7.

The electric vehicle 1 includes an electric motor 11 that is a power source which generates a driving force to drive the rear wheel 8 that is a driven wheel in this preferred embodiment, and a battery 12 that is an energy source which supplies power to the electric motor 11. The battery 12 may be a lithium-ion battery, for example. The driving force of the electric motor 11 is decelerated by a decelerator 13, transmitted to an output shaft 14, and transmitted from the output shaft 14 to the rear wheel 8 via a transmission 15 such as a chain or a belt.

The electric vehicle 1 further includes a clutch 10. The clutch 10 is preferably a mechanical clutch, for example, which switches the connection and disconnection of a driving force transmission path from the electric motor 11 to the rear wheel 8. In this preferred embodiment, the clutch 10 is provided coaxially with the electric motor 11. The clutch 10 may be a hydraulic, multiple disc-type clutch, for example.

A seat 20 which the rider straddles and sits on is attached to the vehicle body frame 2. The battery 12 is housed in a battery case 21 which is provided under the seat 20. The battery case 21 is arranged as an element of the vehicle body frame 2. The battery case 21 has the shape of a box which is opened upward, and a cover 22 is attached to its upper portion such that the cover 22 can be opened and closed. When the seat 20 is removed and thus the cover 22 is opened, it is possible to access the inside of the battery case 21.

Under the battery case 21, a motor case 23 is disposed which houses the electric motor 11, the decelerator 13, and the output shaft 14. In the electric motor case 23, a motor driver 25 which controls the power supplied from the battery 12 to the electric motor 11 is also housed.

The electric motor driver 25 includes an inverter circuit which converts the direct-current power from the battery 12 into alternating-current power and which supplies the alternating-current power to the electric motor 11 and a vehicle controller (so-called an ECU) which defines and functions as a motor controller that controls the inverter circuit.

Figure 2:
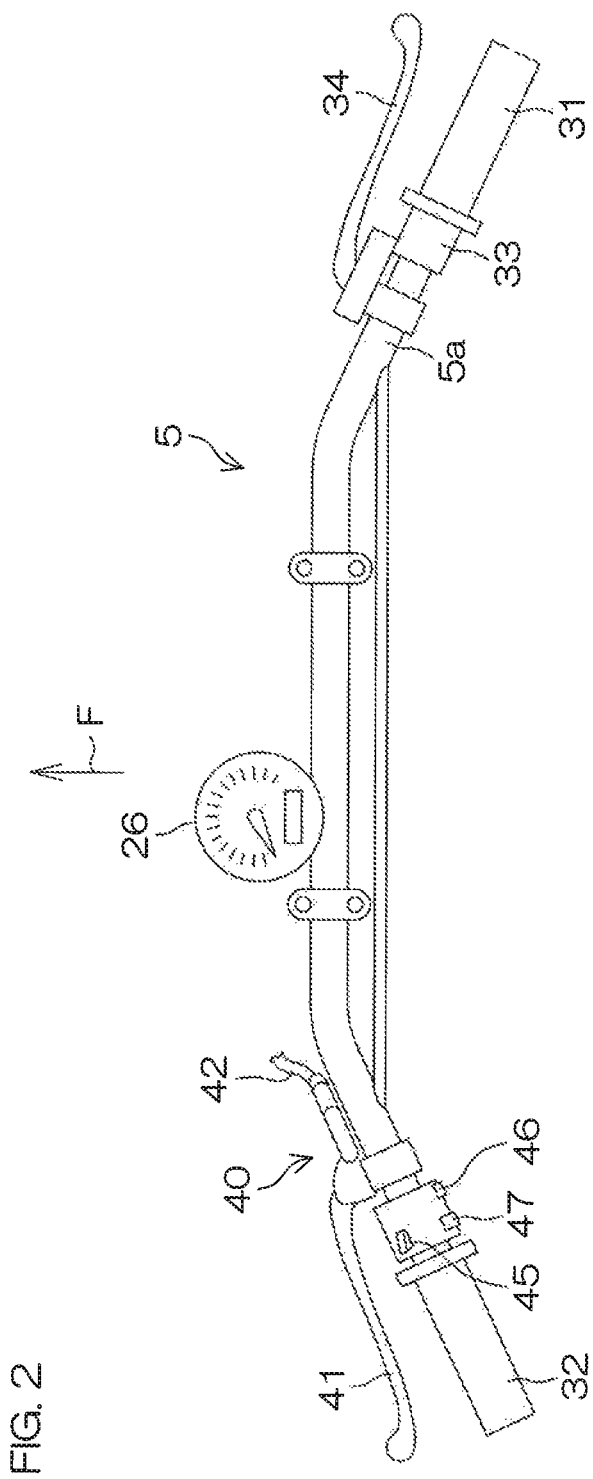
FIG. 2 is a plan view of a steering handle included in the electric vehicle.

FIG. 2 is a plan view of the steering handle 5. The steering handle 5 includes a right grip 31 on the right end and a left grip 32 on the left end. The right grip 31 is attached such that the right grip 31 is able to rotate around a handle shaft 5a of the steering handle 5, and is an accelerator grip that adjusts the driving force (output) of the electric motor 11. In the following description, the right grip 31 is referred to as the "accelerator grip 31." The accelerator grip 31 is an example of an accelerator. The accelerator grip 31 is turned from the initial position toward the side of the rider, and thus it is possible to increase the output of the electric motor 11 according to the amount of turning from the initial position. The amount of turning of the accelerator grip 31 is the amount of operation of the accelerator, and the turning position thereof is an accelerator opening degree. The amount of turning of the accelerator grip 31, that is, the turning position is detected by an accelerator opening degree sensor 33. A front brake lever 34 is located in front of the accelerator grip 31. The front brake lever 34 is an example of a brake operator which is operated by the rider in order to operate a front wheel brake device 35 (see FIG. 1) that brakes the front wheel 4.

The electric vehicle 1 includes a clutch operator 40 which drives the clutch 10 according to the operation by the rider. The clutch operator 40 is attached to the steering handle 5, and is mechanically coupled to the clutch 10. The clutch operator 40 includes a clutch lever 41 which is an example of a clutch operator. The clutch lever 41 is disposed in the vicinity of the left grip 32.

As shown in FIG. 1, the clutch operator 40 is connected via an oil hose 42 to the clutch 10. However, without being limited to this, the clutch operator 40 may be connected via a wire to the clutch 10.

Figure 3:
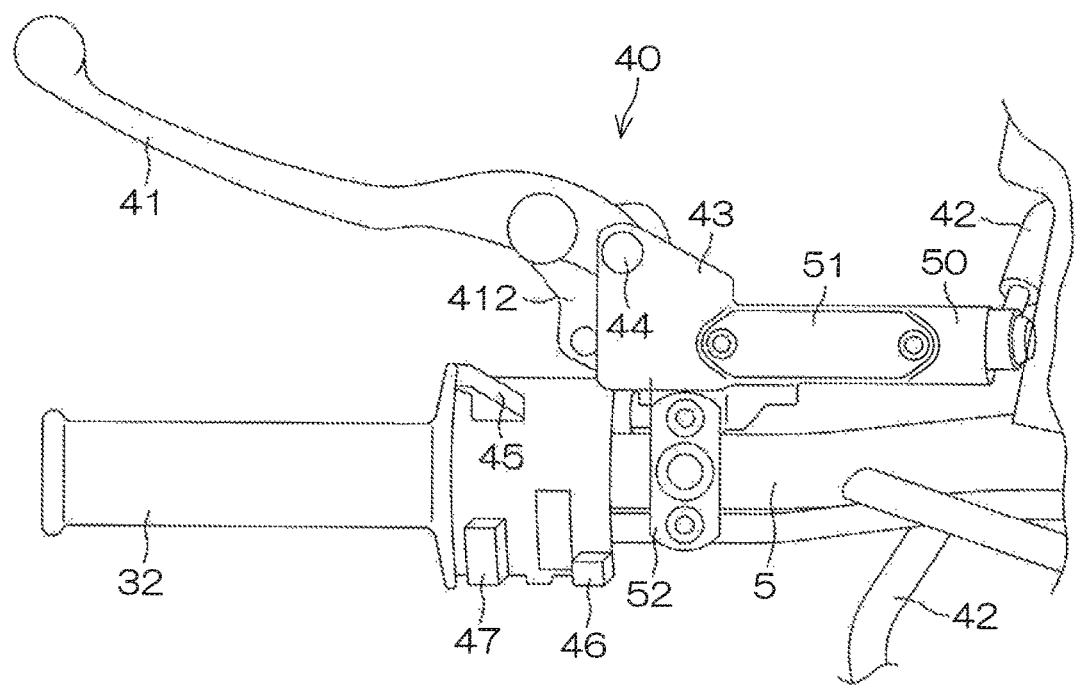
FIG. 3 is an enlarged plan view of the vicinity of a left end portion of the steering handle.
Figure 4:
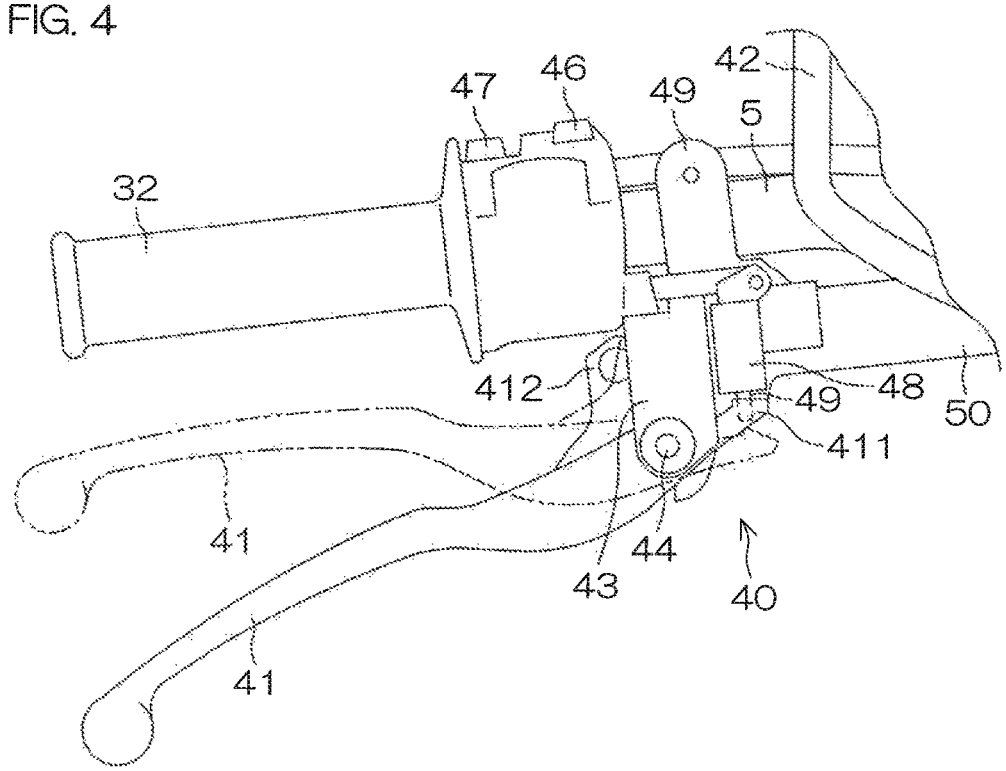
FIG. 4 is an enlarged bottom view of the vicinity of the left end portion of the steering handle.

FIG. 3 is an enlarged plan view of the vicinity of a left end portion of the steering handle 5, and FIG. 4 is a bottom view thereof. In FIG. 4, the clutch lever 41 which is released by the rider is indicated by solid lines, and the clutch lever 41 which is gripped by the rider is indicated by alternate long and two short dashed lines.

In the vicinity of the left grip 32, in addition to the clutch lever 41, a shift-up switch 45, a shift-down switch 46 and a shift automatic/manual switch 47 are disposed.

The electric vehicle 1 is able to be driven in a plurality of drive modes in which the driving characteristics of the electric motor 11 are different. In this preferred embodiment, the plurality of drive modes include a first drive mode, a second drive mode, and a third drive mode. The first drive mode is a first speed mode which is mainly suitable at the time of starting. The second drive mode is a second speed mode which is suitable at the time of acceleration after the completion of the start. The third drive mode is a third speed mode which is suitable for a cruise state where the acceleration is substantially completed. In the first speed mode, the rotational speed of the electric motor 11 is restricted to a first upper limit rotational speed or less. In the second speed mode, the rotational speed of the electric motor 11 is restricted to a second upper limit rotational speed or less. In the third speed mode, the rotational speed of the electric motor 11 is restricted to a third upper limit rotational speed or less. An inequality of the first upper limit rotational speed<the second upper limit rotational speed<the third upper limit rotational speed is met. The first upper limit rotational speed may be a value which corresponds to a vehicle speed of about 40 km/h, for example. The second upper limit rotational speed may be a value which corresponds to a vehicle speed of about 50 km/h, for example. The third upper limit rotational speed is preferably a value which corresponds to the maximum vehicle speed of the electric vehicle 1.

In the following description, the change of the drive mode from the first speed mode to the second speed mode and the change of the drive mode from the second speed mode to the third speed mode are referred to as a "shift up." The change of the drive mode from the third speed mode to the second speed mode and the change of the drive mode from the second speed mode to the first speed mode are referred to as a "shift down." The change of the drive mode (the shift up and the shift down) is referred to as a "shift change."

The shift automatic/manual switch 47 is a switch which is operated by the user in order to select the mode of the shift change. Specifically, by operating the shift automatic/manual switch 47, it is possible to select any one of an automatic mode, a manual mode and a semi-automatic mode. The automatic mode is a shift-change mode in which the shift change is performed by the automatic control of the electric vehicle 1. The manual mode is a shift-change mode in which the shift up and the shift down are performed by the manual operation of the rider. The semi-automatic mode is a shift-change mode in which only the shift up is operated by the operation by the rider and in which the shift down is performed by the automatic control of the electric vehicle 1. The shift automatic/manual switch 47 is an example of a shift input acceptance/rejection operator that switches the enabling and disabling of a shift change command (shift command) input by the rider.

The shift-up switch 45 is a switch which is operated by the rider for the shift up in the manual mode and in the semi-automatic mode. The shift-down switch 46 is a switch which is operated by the rider for the shift down in the manual mode. The shift-up switch 45 and the shift-down switch 46 are examples of a mode shift operator which is operated by the rider in order to switch the drive mode.

The clutch operator 40 includes a main body portion 43 which is attached to the steering handle 5 with a holder 52. In the main body portion 43, the clutch lever 41 which extends outward in the direction of the vehicle width is supported such that the clutch lever 41 is able to rotate about a rotation center portion 44. The clutch lever 41 includes a switch operator 411 which protrudes inward in the direction of the vehicle width and a hydraulic operator 412 which protrudes in the direction of the steering handle 5.

In the main body portion 43, a master cylinder 50 is provided which extends inward in the direction of the vehicle width. On the master cylinder 50, a reservoir tank 51 that adjusts the amount of oil is integrally provided. The interior of the master cylinder 50 is filled with oil. Although not shown in the figure, a piston which is able to move along the direction of the vehicle width and a spring which pushes the piston outward in the direction of the vehicle width are housed within the master cylinder 50. Outside the master cylinder 50 in the direction of the vehicle width, a push rod that pushes the piston inward in the direction of the vehicle width is disposed. The push rod is coupled to the hydraulic operator 412 of the clutch lever 41. The oil hose 42 is coupled to an inward end portion of the master cylinder 50 in the direction of the vehicle width.

When the rider grips the clutch lever 41, the hydraulic operator 412 pushes the piston via the push rod inward in the direction of the vehicle width within the master cylinder 50, and thus the clutch 10 is driven. On the other hand, when the rider releases the clutch lever 41, the spring within the master cylinder 50 pushes the piston outward in the direction of the vehicle width, and thus the clutch lever 41 returns to a position which is spaced apart from the left grip 32.

The clutch operator 40 further includes a clutch switch 48 which is turned on or off by the operation of the clutch lever 41. The clutch switch 48 is an example of an operation detector, and in this preferred embodiment, is a momentary operation-type switch which includes a push button 49. The clutch switch 48 is attached to the main body portion 43.

Due to the switch operator 411 of the clutch lever 41, the push button 49 is pushed or released.

Specifically, when the rider grips the clutch lever 41, the switch operator 411 is released from the push button 49 of the clutch switch 48, and thus the clutch switch 48 outputs an off-signal. On the other hand, when the rider releases the clutch lever 41, and thus the clutch lever 41 is returned to the position which is spaced apart from the left grip 32, the switch operator 411 pushes the push button 49 of the clutch switch 48, and thus the clutch switch 48 outputs an on-signal.

Figure 5:
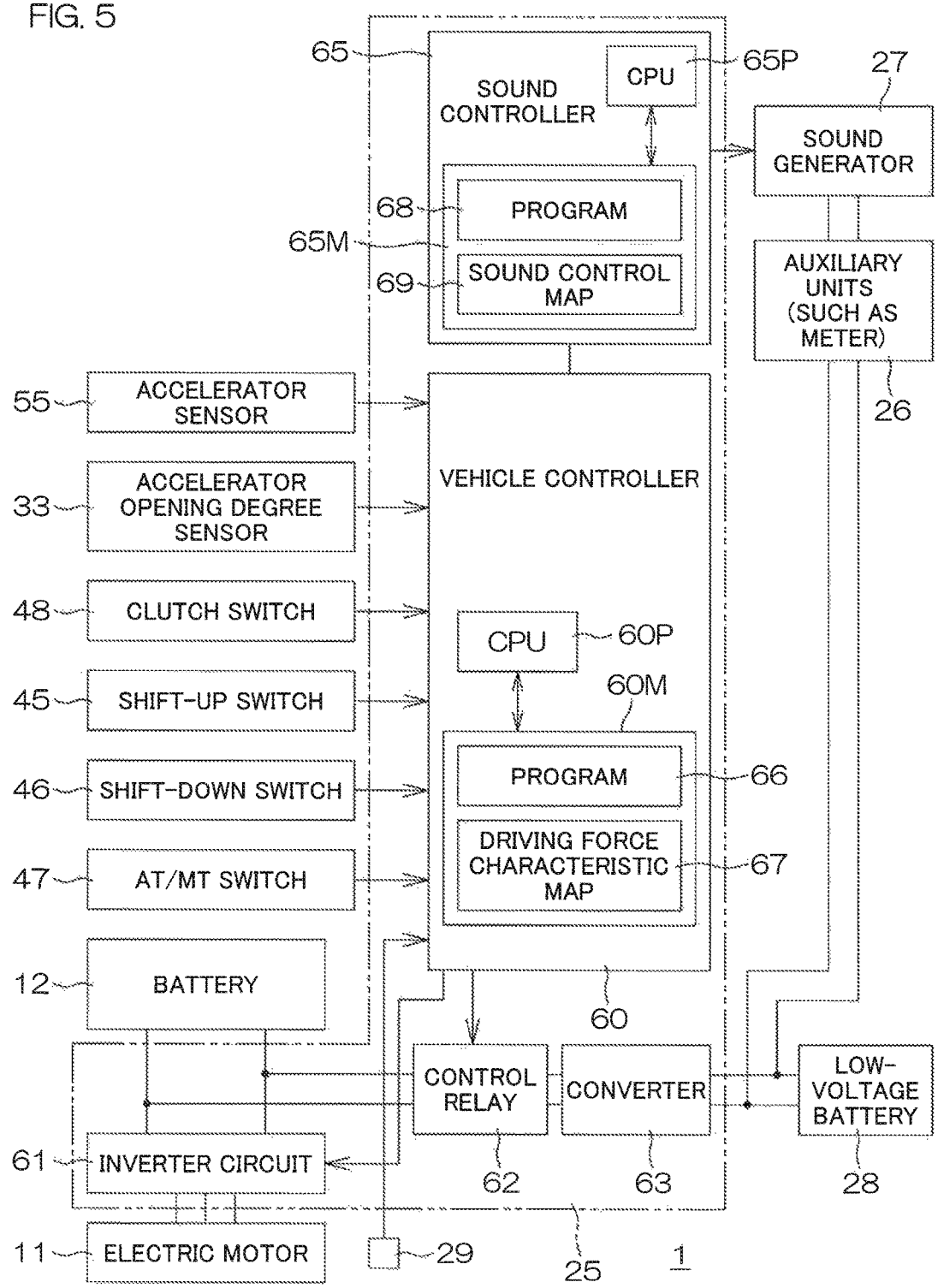
FIG. 5 is a block diagram illustrating the electrical configuration of the electric vehicle.

FIG. 5 is a block diagram illustrating the electrical configuration of the electric vehicle 1. The electric vehicle 1 includes the electric motor 11, the battery 12, the electric motor driver 25, auxiliary units 26, a sound generator 27, and a low-voltage battery 28.

The battery 12 is connected to the electric motor driver 25. The electric motor driver 25 includes an inverter circuit 61 which converts the direct-current power generated by the battery 12 into alternating-current power and which supplies the alternating-current power to the electric motor 11. The electric motor driver 25 further includes a vehicle controller 60, a control relay 62, a converter 63, and a sound controller 65. The inverter circuit 61 is controlled by the vehicle controller 60, and supplies power to the electric motor 11 at a current value corresponding to a command value from the vehicle controller 60.

The low-voltage battery 28 is a battery which supplies power to the auxiliary units 26, and generates direct-current power of a voltage lower than the battery 12 (high-voltage battery). The auxiliary units 26 are electrical components other than the electric motor 11 and the electric motor driver 25. Although the auxiliary units 26 are not illustrated individually, they include lights and gauges, for example. In this preferred embodiment, as one of the auxiliary units 26, the sound generator 27 is included. The sound generator 27 includes a running sound generator which produces a running sound directed toward the rider and surrounding third parties. Specifically, the sound generator 27 includes, for example, a sound source which generates a sound signal, an amplifier which amplifies the sound signal generated by the sound source, and a speaker which is driven by the sound signal amplified by the amplifier to produce sound. The power of the low-voltage battery 28 may be supplied to the vehicle controller 60 and various types of sensors. The various types of sensors include, for example, an encoder 29 which detects the revolution or rotation of the electric motor 11 and a vehicle speed sensor which detects the vehicle speed of the electric vehicle 1.

The converter 63 lowers the power generated by the battery 12 and supplies the power to the low-voltage battery 28. Accordingly, it is possible to charge the low-voltage battery 28 with the power of the battery 12. The control relay 62 is interposed between the battery 12 and the converter 63. The control relay 62 controls the supply of the power from the battery 12 to the converter 63 according to a command from the vehicle controller 60.

The vehicle controller 60 includes a CPU (central processing unit) 60P and a memory 60M, and has a basic configuration as a so-called ECU (electronic control unit). The memory 60M includes a ROM, a RAM, a non-volatile memory and the like. In the memory 60M, programs 66 which are run by the CPU 60P and a driving force characteristic map 67 are stored. The CPU 60P runs the programs 66, and thus the vehicle controller 60 is configured or programmed to define a plurality of functional processors.

An output signal (accelerator opening degree signal) of the accelerator opening degree sensor 33 which detects the amount of operation of the accelerator grip 31 (the accelerator opening degree) is input to the vehicle controller 60. The vehicle controller 60 controls the inverter circuit 61 according to the accelerator opening degree detected by the accelerator opening degree sensor 33, and thus controls the output of the electric motor 11. Accordingly, by operating the accelerator grip 31, the rider (operator) is able to start driving the electric motor 11, adjust the output of the electric motor 11, and stop the electric motor 11. The vehicle controller 60 is an example of a controller in a preferred embodiment of the present invention.

When the electric vehicle 1 is decelerated, the electric motor 11 is rotated by an external force transmitted from the rear wheel 8, and thus the electric motor 11 functions as a generator. At this time, the power generated by the electric motor 11 is regenerated to the battery 12 so as to charge the battery 12. The regeneration operation is controlled by the vehicle controller 60. That is, the vehicle controller 60 is programmed to perform the regeneration control as well.

On the other hand, information on the rotation of the electric motor 11 is input from the encoder 29 that functions as a rotation detector to the vehicle controller 60. The vehicle controller 60 determines, based on the input from the encoder 29, the rotational speed of the electric motor 11. That is, in this preferred embodiment, a motor rotational speed detector is defined by the functions of the encoder 29 and the vehicle controller 60.

The sound controller 65 is connected to the vehicle controller 60. The sound controller 65 includes a CPU 65P and a memory 65M, and has a basic configuration as a so-called ECU (electronic control unit). The memory 65M includes a ROM, a RAM, a non-volatile memory and the like. In the memory 65M, programs 68 which are performed by the CPU 65P and a sound control map 69 are stored. The CPU 65P executes the programs 68, and thus the sound controller 65 is configured or programmed to function as a plurality of function processors.

The sound controller 65 obtains, from the vehicle controller 60, information indicating the accelerator opening degree and the rotational speed of the electric motor 11. The sound controller 65 controls the sound generator 27 based on the rotational speed of the electric motor 11, and thus controls the running sound produced from the sound generator 27. The sound generator 27 produces a sound corresponding to the state of the operation of the electric vehicle 1, that is, the running sound. The sound controller 65 is an example of a running sound controller in a preferred embodiment of the present invention.

More specifically, the sound controller 65 controls the elemental data of the running sound produced by the sound generator 27. Further specifically, the sound controller 65 controls at least one piece of elemental data among a frequency (pitch), an amplitude (magnitude of sound, sound pressure) and a tone color. This control is performed according to a running sound characteristics which are set by the sound control map 69 included in the sound controller 65. The memory 65M which stores the sound control map 69 is an example of a running sound characteristics setter (in this preferred embodiment, a running sound characteristics storage) in a preferred embodiment of the present invention.

Furthermore, the shift-up switch 45, the shift-down switch 46, the shift automatic/manual (AT/MT) switch 47, and the clutch switch 48 are connected to the vehicle controller 60, and the output signals thereof are input. The vehicle controller 60 is configured or programmed to perform control operations corresponding to the input signals (command signals) from the switches 45, 46, 47, and 48. In this preferred embodiment, an accelerator sensor 55 is further connected to the vehicle controller 60. The accelerator sensor 55 detects the acceleration of the electric vehicle 1. In this preferred embodiment, in order to determine whether the electric vehicle 1 is jumping, the output signal of the accelerator sensor 55 is used.

The vehicle controller 60 includes the driving force characteristic map 67 in which the driving force characteristics corresponding to the first speed mode, the second speed mode, and the third speed mode are stored. The driving force characteristic map 67 is stored in advance in the memory 60M included in the vehicle controller 60. Therefore, the memory 60M is an example of a driving force characteristics setter (in this preferred embodiment, a driving force characteristics storage).

Figure 6:
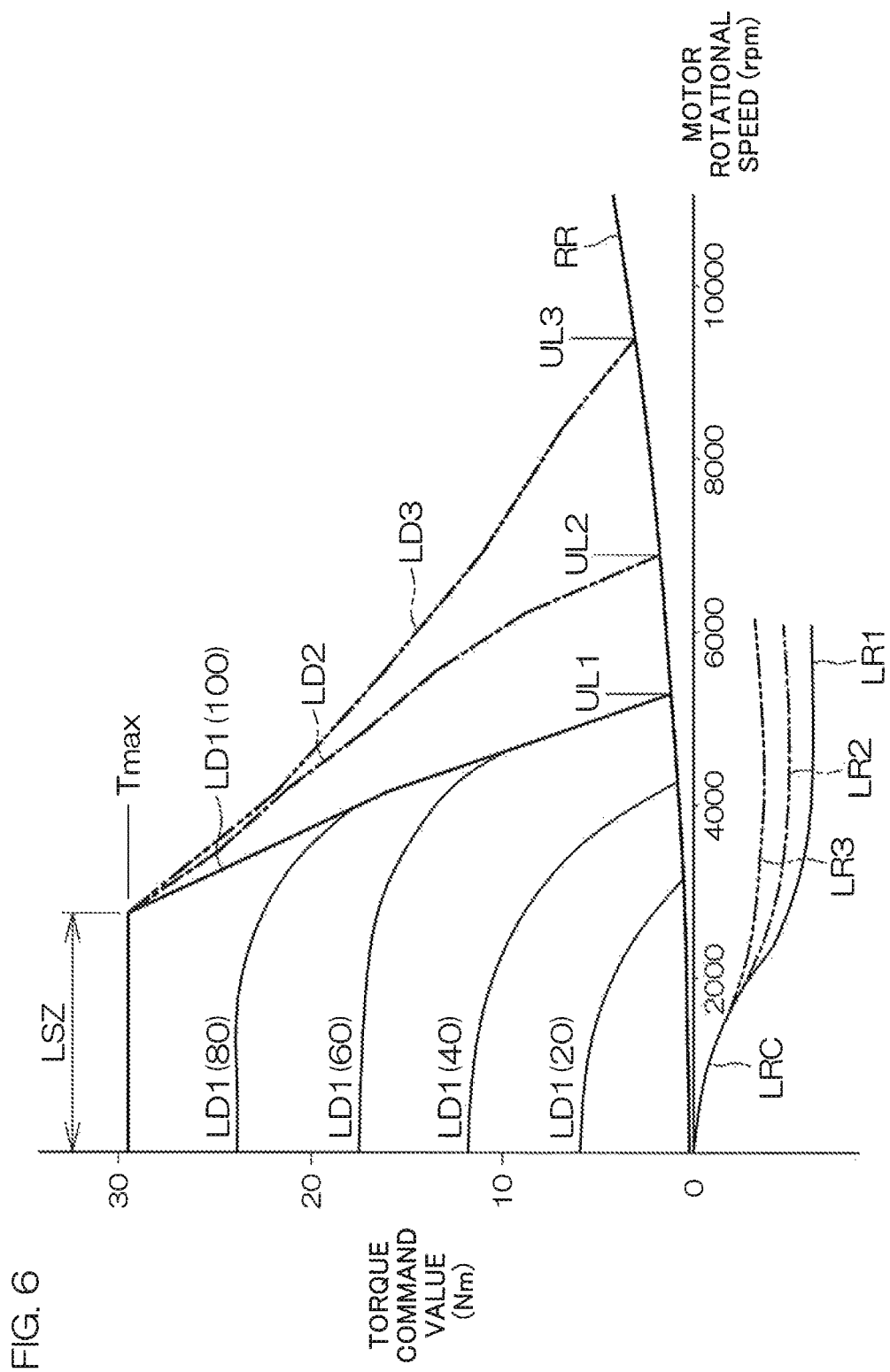
FIG. 6 shows an example of driving force characteristics which are set by a driving force characteristic map.

FIG. 6 is a diagram illustrating an example of the driving force characteristic map 67. In this example, the driving force characteristics determine the characteristics of a torque command value (target motor driving force) for the accelerator opening degree and the rotational speed of the electric motor 11.

In FIG. 6, drive torque command value characteristic lines LD1(20), LD1(40), LD1(60), LD1(80), and LD1(100) in the first speed mode corresponding to, for example, 20%, 40%, 60%, 80%, and 100% (fully opened accelerator) of the accelerator opening degrees are indicated by solid lines, respectively. When the accelerator opening degree is 0% (fully closed accelerator), the torque command value is zero, and thus the electric vehicle 1 generates no driving force. As the accelerator opening degree increases, the torque command value increases. On the other hand, as the rotational speed of the electric motor 11 increases, the torque command value decreases.

The torque command value when the accelerator opening degree is 100% (fully opened accelerator) is constant at an upper limit torque command value Tmax (in the example of FIG. 6, about 30 Nm, for example) in a low speed zone LSZ where the rotational speed of the electric motor 11 is relatively low. In a motor rotational speed zone which exceeds the upper limit value of the low speed zone LSZ, the torque command value monotonically decreases as the rotational speed of the electric motor 11 increases. A curve RR is a limit driving force curve which indicates variations in road surface resistance corresponding to the rotational speed of the electric motor 11 (that is, corresponding to the vehicle speed). At intersections between the limit driving force curve RR and the drive torque command value characteristic lines LD1(20), LD1(40), LD1(60), LD1(80), and LD1(100), the driving force generated by the electric motor 11 and the road surface resistance are balanced. Therefore, the intersection between a torque command value characteristic line LD1(100) corresponding to 100% of the accelerator opening degree and the limit driving force curve RR specifies a first upper limit rotational speed UL1 which is the upper limit of the rotational speed of the electric motor 11 in the first speed mode. That is, the first speed mode is a drive mode in which the rotational speed of the electric motor 11 in a range of the first upper limit rotational speed UL1 or less is allowed.

A drive torque command value characteristic line LD2 in the second speed mode corresponding to 100% of the accelerator opening degree (fully opened accelerator) is indicated by an alternate long and short dashed line. The drive torque command value characteristics corresponding to other values of the accelerator opening degree are, as in the case of the first speed mode, stored in the driving force characteristic map 67. However, since the figure becomes complicated, they are not illustrated in FIG. 6. The torque command value when the accelerator opening degree is 100% (fully opened accelerator) is constant at the upper limit torque command value Tmax in the low speed zone LSZ where the rotational speed of the electric motor 11 is relatively low. In the electric motor rotational speed zone which exceeds the upper limit value of the low speed zone LSZ, the torque command value monotonically decreases as the rotational speed of the electric motor 11 increases. However, as compared with the first speed mode, the percentage of the decrease in the rotational speed of the electric motor 11 is low. At intersections between the limit driving force curve RR and the drive torque command value characteristic lines, the driving force generated by the electric motor 11 and the road surface resistance are balanced, as in the case of the first speed mode. Therefore, the intersection between a torque command value characteristic line LD2 corresponding to 100% of the accelerator opening degree and the limit driving force curve RR specifies a second upper limit rotational speed UL2 (>UL1) which is the upper limit of the rotational speed of the electric motor 11 in the second speed mode. That is, the second speed mode is a drive mode in which the rotational speed of the electric motor 11 in a range of the second upper limit rotational speed UL2 or less is allowed. The second upper limit rotational speed UL2 is larger than the first upper limit rotational speed UL1. Therefore, in the second speed mode, it is possible to drive the electric motor 11 at a rotation speed higher than in the first speed mode, and accordingly, it is possible to make the electric vehicle 1 run at a higher speed.

A drive torque command value characteristic line LD3 in the third speed mode corresponding to 100% of the accelerator opening degree (fully opened accelerator) is indicated by an alternate long and two short dashed line. The drive torque command value characteristics corresponding to other values of the accelerator opening degree are, as in the case of the first speed mode, stored in the driving force characteristic map 67. However, since the figure becomes complicated, they are not illustrated in FIG. 6. The torque command value when the accelerator opening degree is 100% (fully opened accelerator) is constant at the upper limit torque command value Tmax in the low speed zone LSZ where the rotational speed of the electric motor 11 is relatively low. In the electric motor rotational speed zone which exceeds the upper limit value of the low speed zone LSZ, the torque command value monotonically decreases as the rotational speed of the electric motor 11 increases. However, as compared with the second speed mode, the percentage of the decreases in the rotational speed of the electric motor 11 is low. At intersections between the limit driving force curve RR and the drive torque command value characteristic lines, the driving force generated by the electric motor 11 and the road surface resistance are balanced, as in the cases of the first speed mode and the second speed mode. Therefore, the intersection between a torque command value characteristic line LD3 corresponding to 100% of the accelerator opening degree and the limit driving force curve RR specifies a third upper limit rotational speed UL3 (>UL2) which is the upper limit of the rotational speed of the electric motor 11 in the third speed mode. That is, the third speed mode is a drive mode in which the rotational speed of the electric motor 11 in a range of the third upper limit rotational speed UL3 or less is allowed. The third upper limit rotational speed UL3 is larger than the second upper limit rotational speed UL2. Therefore, in the third speed mode, it is possible to drive the electric motor 11 at a rotation speed higher than in the second speed mode, and accordingly, it is possible to make the electric vehicle 1 run at a higher speed.

In this preferred embodiment, a difference between the second upper limit rotational speed UL2 and the third upper limit rotational speed UL3 is larger than a difference between the first upper limit rotational speed UL1 and the second upper limit rotational speed UL2.

In this preferred embodiment, when in the first speed mode, the second speed mode, and the third speed mode, the accelerator is fully opened, in the common low speed zone LSZ, the upper limit torque command value Tmax is generated. Therefore, in any drive mode, in the low speed zone LSZ, a large torque is generated in the electric motor 11. The low speed zone LSZ is a common characteristics zone where the drive torque command value characteristics in the first speed mode, the second speed mode, and the third speed mode becomes equal or substantially equal to each other.

When the friction coefficient of a road surface such as an unpaved road is low, if a large driving force is generated while the vehicle speed is low, there is a possibility that the rear wheel 8 slips and that thus the rotational speed of the electric motor 11 is rapidly raised to the upper limit rotational speed. In such a situation, the electric vehicle 1 is started in the first speed mode, then the mode is sequentially shifted up to the second speed mode and then to the third speed mode, and thus it is possible to reduce or prevent an increase in the rotational speed of the rear wheel 8, with the result that it is possible to make the electric vehicle 1 start and run in a stable state.

On the other hand, when the friction coefficient of a road surface such as a paved road is high, since it is unlikely that the rear wheel 8 slips, the rotational speed of the electric motor 11 does not rapidly increase. Therefore, even when the electric vehicle 1 is started not only in the first speed mode but also in the second speed mode or the third speed mode, it is possible to secure a stable running state of the electric vehicle 1.

The drive torque command value characteristic lines LD1(20) to LD1(100), LD2, and LD3 specify power running characteristics which are applied when the revolution of the electric motor 11 is accelerated.

FIG. 6 further shows the characteristics of a regeneration torque command value (regeneration force) for the regeneration operation performed when the electric vehicle 1 is decelerated, that is, regeneration characteristics. That is, a regeneration torque command value characteristic line LR1 in the first speed mode is indicated by a solid line, a regeneration torque command value characteristic line LR2 in the second speed mode is indicated by an alternate long and short dashed line, and a regeneration torque command value characteristic line LR3 in the third speed mode is indicated by an alternate long and two short dashed line. The regeneration operation is performed, for example, when the accelerator is fully closed (0%).

In this preferred embodiment, in an extremely low speed zone, the regeneration torque command value characteristic lines LR1, LR2, and LR3 in the first speed mode, the second speed mode, and the third speed mode overlap each other, and the vehicle controller 60 generates the regeneration torque command value (target motor driving force) according to a common regeneration torque command value characteristic line LRC. On the other hand, in a rotational speed zone higher in speed than the extremely low speed zone, the regeneration torque command value in the first speed mode is larger in absolute value than the regeneration torque command value in the second speed mode, and the regeneration torque command value in the second speed mode is larger in absolute value than the regeneration torque command value in the third speed mode.

Figure 7:
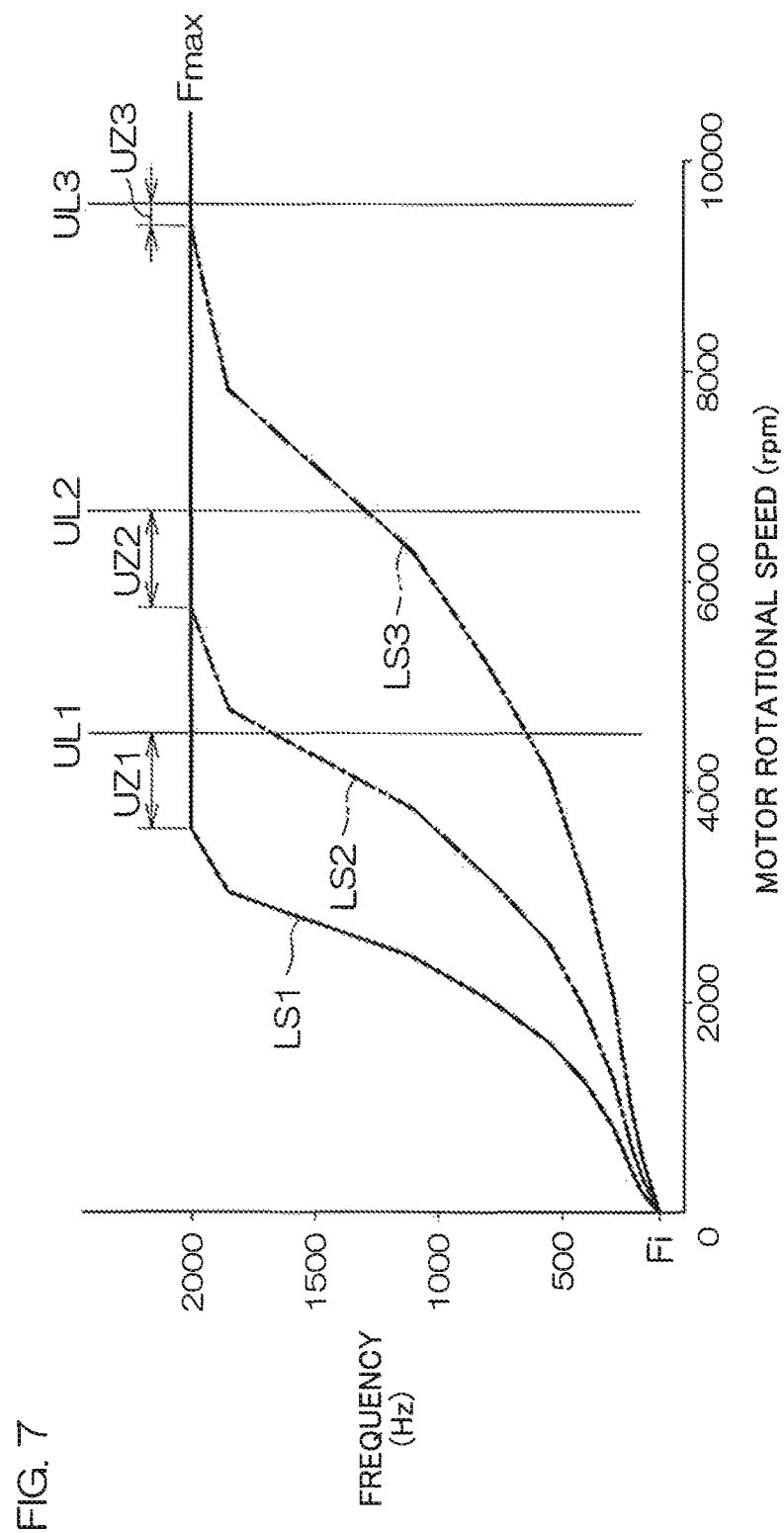
FIG. 7 shows an example of a plurality of running force characteristics which are set by a sound control map.

FIG. 7 shows examples of a plurality of running sound characteristics set in the sound control map 69, and shows changes in the frequency (pitch) corresponding to the rotational speed of the electric motor 11. The sound control map 69 stores data which corresponds to a first running sound characteristic line LS1 corresponding to the first speed mode, a second running sound characteristic line LS2 corresponding to the second speed mode, and a third running sound characteristic line LS3 corresponding to the third speed mode. These running sound characteristic lines LS1, LS2, and LS3 indicate the characteristics of the frequency of the running sound for the rotational speed of the electric motor 11.

The first running sound characteristic line LS1 sets an idling frequency Fi when the rotational speed of the electric motor 11=0, and sets the frequency such that the frequency monotonically increases to the maximum frequency Fmax as the rotational speed of the electric motor 11 increases. Then, in a first upper limit rotational speed zone UZ1 set in the vicinity of the first upper limit rotational speed UL1, the frequency is saturated at the maximum frequency Fmax. The second running sound characteristic line LS2 sets the idling frequency Fi when the rotational speed of the electric motor 11=0, and sets the frequency such that the frequency monotonically increases to the maximum frequency Fmax as the rotational speed of the electric motor 11 increases. Then, in a second upper limit rotational speed zone UZ2 set in the vicinity of the second upper limit rotational speed UL2, the frequency is saturated at the maximum frequency Fmax. The second upper limit rotational speed zone UZ2 is a rotational speed zone which is higher in speed than the first upper limit rotational speed zone UZ1. The third running sound characteristic line LS3 sets the idling frequency Fi when the rotational speed of the electric motor 11=0, and sets the frequency such that the frequency monotonically increases to the maximum frequency Fmax as the rotational speed of the electric motor 11 increases. Then, in a third upper limit rotational speed zone UZ3 set in the vicinity of the third upper limit rotational speed UL3, the frequency is saturated at the maximum frequency Fmax. The third upper limit rotational speed zone UZ3 is a rotational speed zone which is higher in speed than the second upper limit rotational speed zone UZ2.

At an arbitrary rotational speed of the electric motor 11 in a motor rotational speed zone whose rotational speed is more than 0 and equal to or less than the first upper limit rotational speed UL1, the first running sound characteristic line LS1 sets the frequency higher than the second running sound characteristic line LS2, and the second running sound characteristic line LS2 sets the frequency higher than the third running sound characteristic line LS3. At an arbitrary rotational speed of the electric motor 11 in a motor rotational speed zone whose rotational speed is more than the first upper limit rotational speed UL1 and equal to or less than the second upper limit rotational speed UL2, the second running sound characteristic line LS2 sets the frequency higher than the third running sound characteristic line LS3.

The first upper limit rotational speed zone UZ1 and the second upper limit rotational speed zone UZ2 are motor rotational speed zones which are separate from each other. Therefore, at the first upper limit rotational speed UL1, a gap is produced between the first running sound characteristic line LS1 and the second running sound characteristic line LS2. More specifically, in the first upper limit rotational speed zone UZ1, the second running sound characteristic line LS2 sets the frequency lower than the maximum frequency Fmax, and thus in the first upper limit rotational speed zone UZ1, the gap is produced between the first running sound characteristic line LS1 and the second running sound characteristic line LS2.

Similarly, the second upper limit rotational speed zone UZ2 and the third upper limit rotational speed zone UZ3 are motor rotational speed zones which are separate from each other. Therefore, at the second upper limit rotational speed UL2, a gap is produced between the second running sound characteristic line LS2 and the third running sound characteristic line LS3. More specifically, in the second upper limit rotational speed zone UZ2, the third running sound characteristic line LS3 sets the frequency lower than the maximum frequency Fmax, and thus in the second upper limit rotational speed zone UZ2, the gap is produced between the second running sound characteristic line LS2 and the third running sound characteristic line LS3.

The sound controller 65 acquires, from the vehicle controller 60, information on the drive mode and information on the rotational speed of the electric motor. Then, the sound controller 65 sets the frequency corresponding to the rotational speed of the electric motor 11 according to the running sound characteristic line LS1, LS2, or LS3 corresponding to the acquired drive mode. Furthermore, the sound controller 65 controls the sound generator 27 so as to produce the running sound of the set frequency.

When the drive mode is changed (shift change), the sound controller 65 accordingly switches the running sound characteristic lines LS1, LS2, and LS3 to be referenced. Therefore, the frequency of the running sound produced by the sound generator 27 is instantaneously changed according to the gaps between the running sound characteristic lines LS1, LS2, and LS3. The change in the frequency thus becomes discontinuous, and thus the rider is able to recognize the change of the drive mode (shift change).

Focusing on the rate of change of the frequency with respect to the rotational speed of the electric motor 11, the first running sound characteristic line LS1 specifies a characteristic in which the rate of change of the frequency until the first upper limit rotational speed UL1 is reached is high. The second running sound characteristic line LS2 specifies a characteristic in which the rate of change of the frequency until the second upper limit rotational speed UL2 is reached is lower than in the case of the first running sound characteristic line LS1. The third running sound characteristic line LS3 specifies a characteristic in which the rate of change of the frequency until the third upper limit rotational speed UL3 is reached is lower than in the case of the second running sound characteristic line LS2. Therefore, since in a drive mode in the stage of a lower speed, the frequency of the running sound is varied more significantly, the rider easily recognizes a subtle change in the rotational speed of the electric motor 11 when the electric vehicle 1 is running at a low speed. It is thus possible to provide the electric vehicle 1 which is easy to operate when running at a low speed.

Preferably, in the running sound characteristic lines LS1, LS2, and LS3, in an extremely low speed rotational speed zone in the vicinity of the rotational speed of the electric motor 11=0, the rate of change of the frequency with respect to the rotational speed of the electric motor 11 is relatively high. The change in the frequency with respect to the rotational speed of the electric motor 11 when the electric vehicle 1 is running at a low speed is thus made clear, and thus the rider easily recognizes a subtle change in the rotational speed of the electric motor 11. It thus becomes easy to operate the electric vehicle 1 when running at a low speed.

Figure 8:
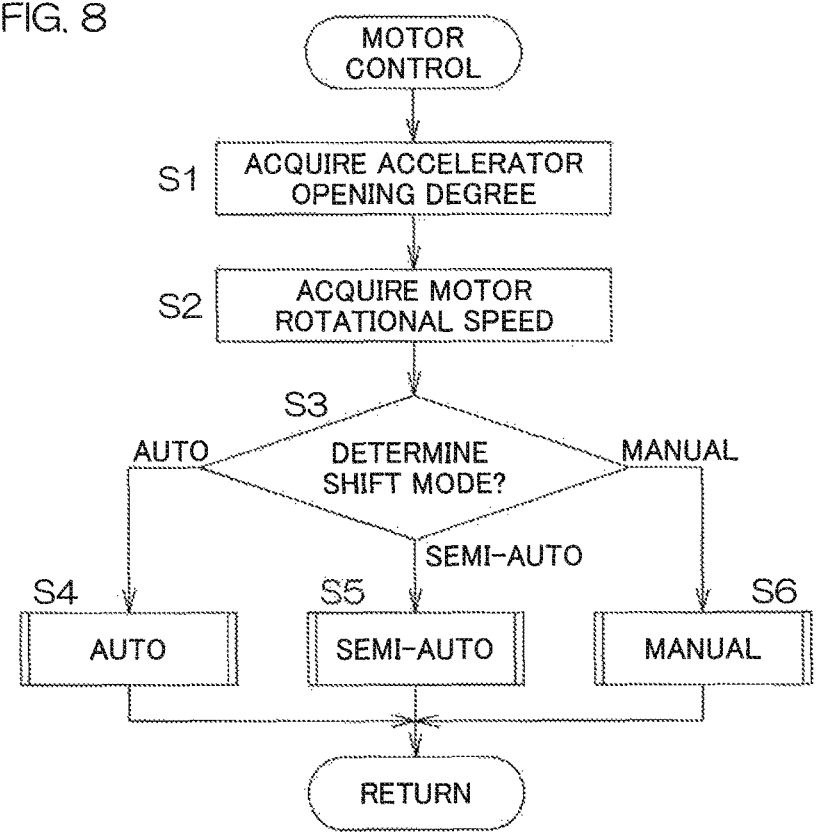
FIG. 8 is a flowchart illustrating an example of the details of the process performed by a vehicle controller to control an electric motor.

FIG. 8 is a flowchart illustrating an example of the detailed process performed by the vehicle controller 60 to control the electric motor 11. The vehicle controller 60 acquires the accelerator opening degree input from the accelerator opening degree sensor 33 (step S1). The vehicle controller 60 determines the rotational speed of the electric motor 11 based on the output signal of the encoder 29 (step S2). The vehicle controller 60 determines to which one of the automatic mode, the semi-automatic mode, and the manual mode the shift-change mode is set by the shift automatic/manual switch 47 (step S3).

The automatic mode is a control mode in which shift-change commands provided by the shift-up switch 45 and the shift-down switch 46 are disabled and in which the shift change is performed by the automatic control of the vehicle controller 60. In this preferred embodiment, when the automatic mode is set, the vehicle controller 60 controls the electric motor 11 in the third speed mode. The semi-automatic mode is a control mode in which the shift up is performed in response to the operation of the shift-up switch 45 whereas a shift-down command provided by the shift-down switch 46 is disabled. That is, the shift up is performed according to the manual operation of the rider whereas the shift down is performed by the automatic control of the vehicle controller 60. The manual mode is a control mode in which the shift up is performed in response to the operation of the shift-up switch 45 and in which the shift down is performed in response to the operation of the shift-down switch 46.

The process performed by the vehicle controller 60 is branched, according to the setting of the shift automatic/manual switch 47, to any one of the control in the automatic mode (step S4), the control in the semi-automatic mode (step S5), and the control in the manual mode (step S6).

Figure 9:
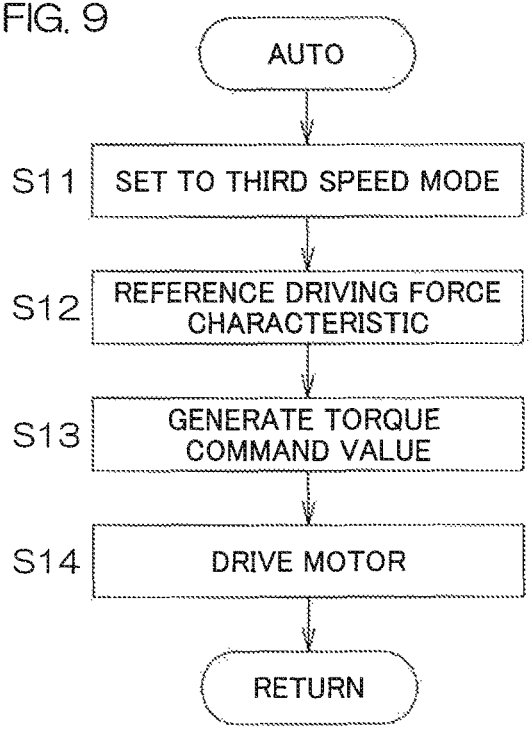
FIG. 9 is a flowchart illustrating an example of the control in an automatic mode (step S4 in FIG. 8).

FIG. 9 is a flowchart illustrating an example of the control in the automatic mode (step S4 of FIG. 8). When the automatic mode is set, the vehicle controller 60 sets the drive mode to the third speed mode (step S11), and controls the electric motor 11 according to the third speed mode. That is, the vehicle controller 60 references, in the driving force characteristic map 67, the driving force characteristics in the third speed mode (the torque command value characteristic lines LD3 and LR3 in FIG. 6) (step S12). Then, the vehicle controller 60 reads, from the driving force characteristic map 67, the torque command value corresponding to the accelerator opening degree and the rotational speed of the electric motor 11, and generates the torque command value (step S13). The vehicle controller 60 controls the inverter circuit 61 based on the torque command value (step S14).

The control in the automatic mode is not limited to this example. For example, the control in the automatic mode may be the control in which an automatic shift up from the first speed mode to the second speed mode and/or an automatic shift up from the second speed mode to the third speed mode is performed according to the accelerator opening degree and/or the rotational speed of the electric motor 11.

Figure 10:
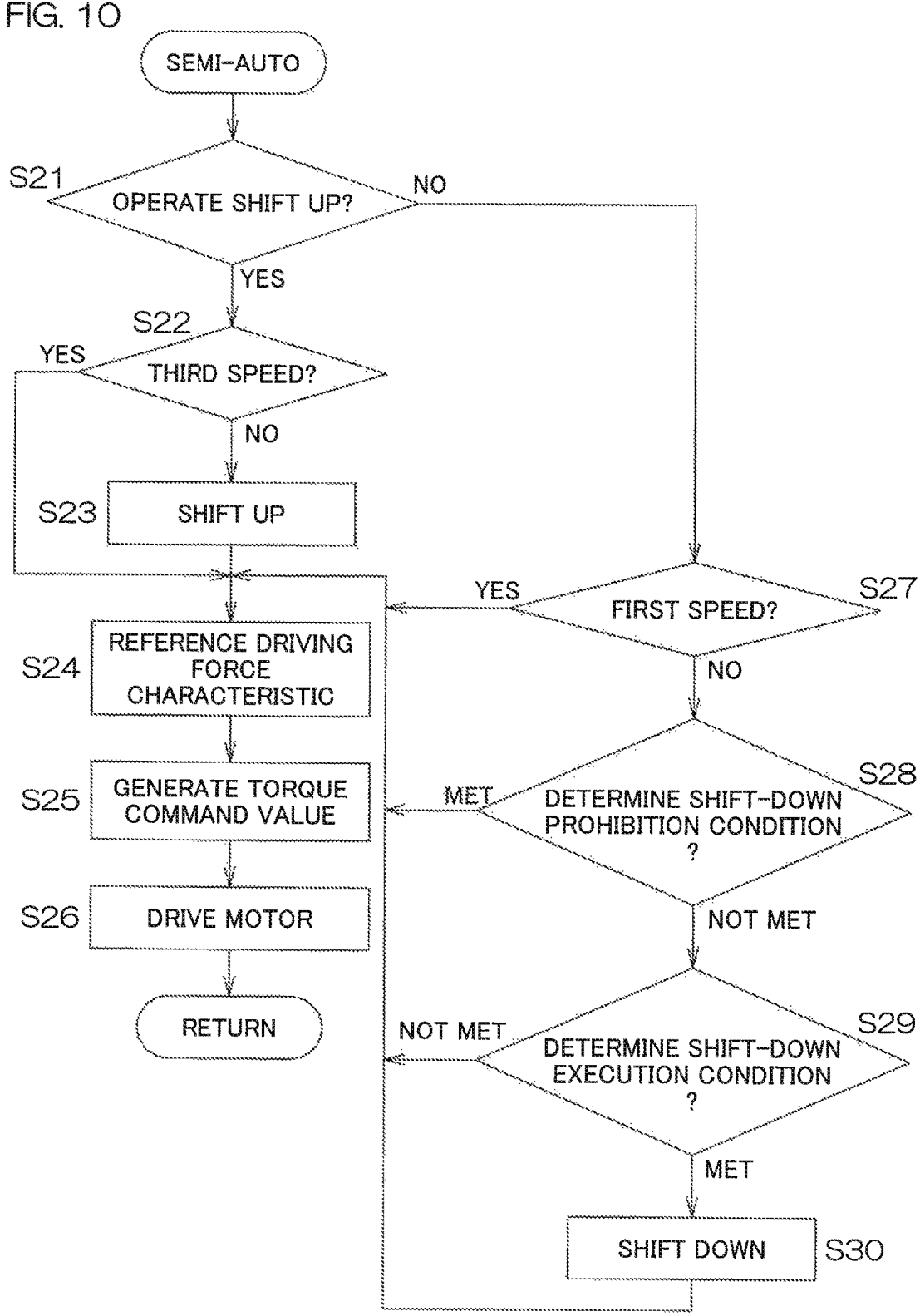
FIG. 10 is a flowchart illustrating an example of the control in a semi-automatic mode (step S5 in FIG. 8).

FIG. 10 is a flowchart illustrating an example of the control in the semi-automatic mode (step S5 of FIG. 8). When the semi-automatic mode is set, the vehicle controller 60 monitors whether or not the shift up command is input from the shift-up switch 45 (step S21). When the shift up command is input (step S21: YES), the vehicle controller 60 determines whether or not the current drive mode is the third speed mode (step S22). When the current drive mode is a mode other than the third speed mode (step S22: NO), that is, the current drive mode is the first speed mode or the second speed mode, the shift up is performed (step S23). Specifically, when the current drive mode is the first speed mode, the drive mode is changed to the second speed mode. When the current drive mode is the second speed mode, the drive mode is changed to the third speed mode. When the current drive mode is the third speed mode (step S22: YES), since it is impossible to perform any more shifts up, the shift up process (step S23) is omitted. Thus, the drive mode is set.

The vehicle controller 60 references the driving force characteristic map 67 based on the drive mode which has been set (step S24). That is, the driving force characteristics (the torque command value characteristic lines LD1 to LD3 and LR1 to LR3) corresponding to the set drive mode is referenced. Then, the vehicle controller 60 reads, from the driving force characteristic map 67, the torque command value corresponding to the accelerator opening degree and the rotational speed of the electric motor 11, and generates the torque command value (step S25). The vehicle controller 60 controls the inverter circuit 61 based on the torque command value so as to drive the electric motor 11 (step S26).

On the other hand, when the operation of the shift-up switch 45 is not performed (step S21: NO), the vehicle controller 60 determines whether or not the current drive mode is the first speed mode (step S27). When the current drive mode is the first speed mode (step S27: YES), since it is impossible to perform any more shifts down, the vehicle controller 60 performs the process from step S24 and controls the electric motor 11 according to the driving force characteristics in the first speed mode (the torque command value characteristic lines LD1 and LR1 in FIG. 6) (steps S25 and S26).

When the current drive mode is not the first speed mode (step S27: NO), that is, the current drive mode is the second speed mode or the third speed mode, the vehicle controller 60 determines whether or not a shift-down prohibition condition is met (step S28). When the shift-down prohibition condition is met (step S28: Met), the vehicle controller 60 maintains the current drive mode (the second speed mode or the third speed mode), performs the process from step S24, and controls the electric motor 11 according to the current drive mode (steps S24 to S26).

When the shift-down prohibition condition is not met (step S28: Not met), the vehicle controller 60 further determines whether or not a shift-down execution condition is met (step S29). When the shift-down execution condition is not met (step S29: Not met), the vehicle controller 60 maintains the current drive mode (the second speed mode or the third speed mode), performs the process from step S24, and controls the electric motor 11 according to the current drive mode (steps S24 to S26).

When the shift-down prohibition condition (step S28) is not met and the shift-down execution condition (step S29) is met, the vehicle controller 60 performs an automatic shift down (step S30). That is, the vehicle controller 60 performs the shift down regardless of the operation of the shift-down switch 46. When the current drive mode is the second speed mode, the current drive mode is shifted down to the first speed mode whereas when the current drive mode is the third drive mode, the current drive mode is shifted down to the second speed mode. Thereafter, the vehicle controller 60 performs the process from step S24 and controls the electric motor 11 according to the new drive mode after the shift down (steps S24 to S26).

Figure 11:
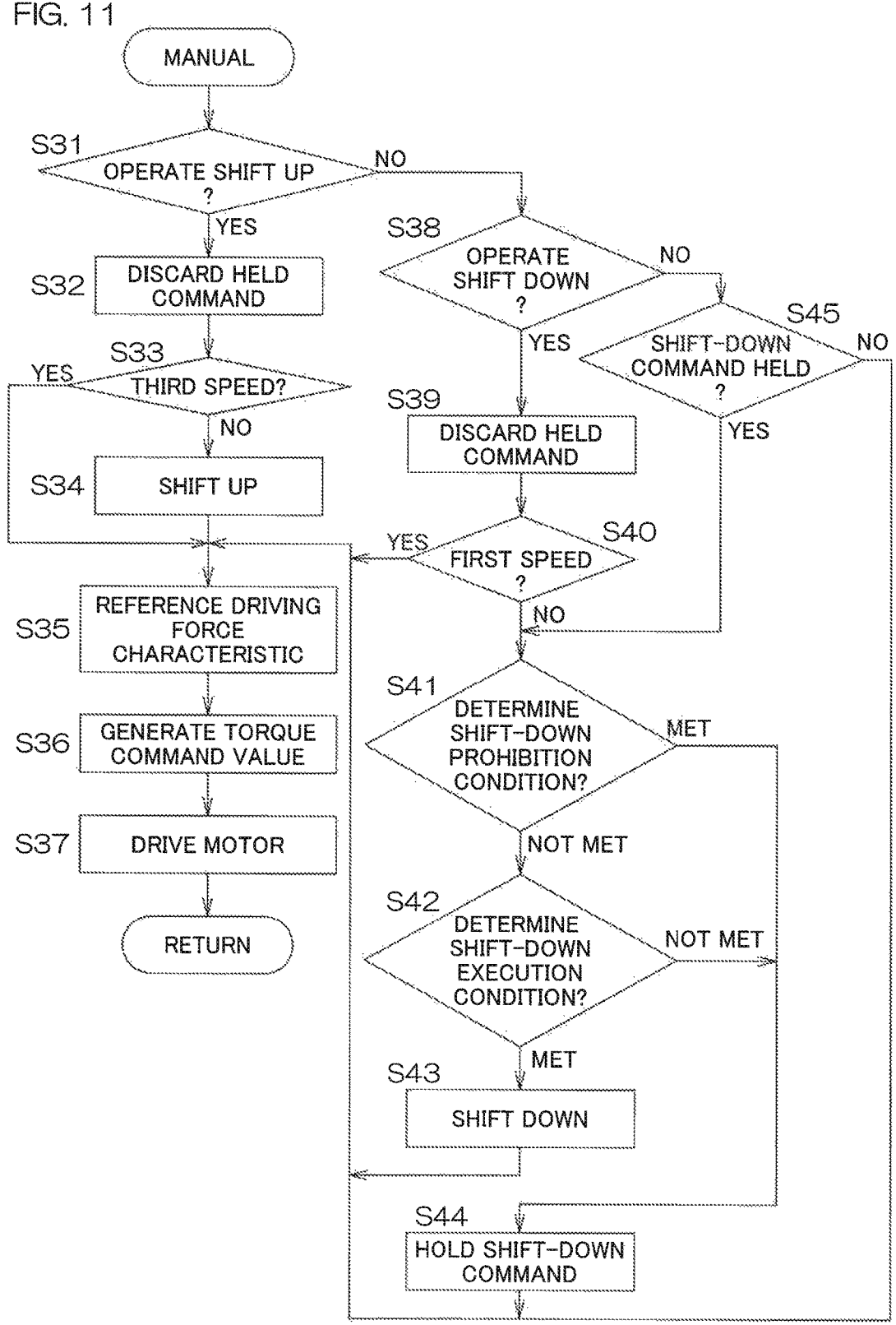
FIG. 11 is a flowchart illustrating an example of the control in a manual mode (step S6 in FIG. 8).

FIG. 11 is a flowchart illustrating an example of the control in the manual mode (step S6 of FIG. 8). When the manual mode is set, the vehicle controller 60 monitors whether or not the shift-up command is input from the shift-up switch 45 (step S31), and also monitors whether or not the shift-down command is input from the shift-down switch 46 (step S32).

When the shift-up command is input (step S31: YES), if any shift-down command is being withheld, the vehicle controller 60 discards that command (step S32). Then, the vehicle controller 60 determines whether or not the current drive mode is the third speed mode (step S33). When the current drive mode is a mode other than the third speed mode (step S33: NO), that is, the current drive mode is the first speed mode or the second speed mode, the shift up is performed (step S34). Specifically, when the current drive mode is the first speed mode, the drive mode is changed to the second speed mode. When the current drive mode is the second speed mode, the drive mode is changed to the third speed mode. When the current drive mode is the third speed mode (step S33: YES), since it is impossible to perform any more shifts up, the shift up process (step S34) is omitted. Thus, the drive mode is set.

The vehicle controller 60 references the driving force characteristic map 67 based on the drive mode which has been set (step S35). That is, the driving force characteristics (the torque command value characteristic lines LD1 to LD3 and LR1 to LR3) corresponding to the set drive mode is referenced. Then, the vehicle controller 60 reads, from the driving force characteristic map 67, the torque command value corresponding to the accelerator opening degree and the rotational speed of the electric motor 11, and generates the torque command value (step S36). The vehicle controller 60 controls the inverter circuit 61 based on the torque command value so as to drive the electric motor 11 (step S37).

On the other hand, when the operation of the shift-up switch 45 is not performed (step S31: NO), the vehicle controller 60 determines whether or not the shift-down command is input by the operation of the shift-down switch 46 (step S38). When the shift-down command is input (step S38: YES), if any shift-down command (step S39) is being withheld, the vehicle controller 60 discards that command. Then, the vehicle controller 60 determines whether or not the current drive mode is the first speed mode (step S40). When the current drive mode is the first speed mode (step S40: YES), since it is impossible to perform any more shifts down, the vehicle controller 60 performs the process from step S35 and controls the electric motor 11 according to the driving force characteristics in the first speed mode (the torque command value characteristic lines LD1 and LR1 in FIG. 6) (steps S35 to S37).

When the current drive mode is not the first speed mode (step S40: NO), that is, the current drive mode is the second speed mode or the third speed mode, the vehicle controller 60 determines whether or not the shift-down prohibition condition (step S41) is met. When the shift-down prohibition condition (step S41) is met, the vehicle controller 60 withholds the shift-down command (step S44). Then, the vehicle controller 60 does not perform the shift down (step S43), maintains the current drive mode (the second speed mode or the third speed mode), performs the process from step S35, and controls the electric motor 11 according to the current drive mode (steps S35 to S37). When the shift-down prohibition condition (step S41) is not met, the vehicle controller 60 further determines whether or not the shift-down execution condition is met (step S42). When the shift-down execution condition (step S42) is not met, the vehicle controller 60 withholds the shift-down command (step S44). Then, the vehicle controller 60 does not perform the shift down (step S43), maintains the current drive mode (the second speed mode or the third speed mode), performs the process from step S35, and controls the electric motor 11 according to the current drive mode (steps S35 to S37).

When the shift-down prohibition condition (step S41) is not met and the shift-down execution condition (step S42) is met, the vehicle controller 60 performs the shift down (step S43) according to the currently enabled shift-down command. When the current drive mode is the second speed mode, the current drive mode is shifted down to the first speed mode whereas when the current drive mode is the third drive mode, the current drive mode is shifted down to the second speed mode. Thereafter, the vehicle controller 60 performs the process from step S35 and controls the electric motor 11 according to the new drive mode after the shift down (steps S35 to S37).

When neither the shift-up operation nor the shift-down operation is performed (NO in both steps S31 and S38), and therefore, the shift-change command is not input, the vehicle controller 60 determines whether or not the shift-down command (step S45) is being withheld. When the shift-down command is being withheld (step S45: YES), the vehicle controller 60 performs the process from step S41 and determines whether or not the shift-down prohibition condition (step S41) is met and whether or not the shift-down execution condition (step S42) is met.

When the shift-down prohibition condition (step S41) is not met and the shift-down execution condition (step S42) is met while the shift-down command is being withheld (step S45: YES), the vehicle controller 60 performs the shift down (step S43). That is, when the shift-down command is input (step S48: YES), if the shift-down prohibition condition (step S41) is met or the shift-down execution condition (step S42) is not met, the shift-down command is temporarily brought into a withheld state (step S44). Then, the vehicle controller 60 stands by until the shift-down prohibition condition (step S41) is not met and the shift-down execution condition (step S42) is met, and thereafter the shift down (step S43) is performed.

When neither the shift-up operation nor the shift-down operation is performed (NO in both steps S31 and S38), and there is no shift-down command (NO in step S45) being withheld, the vehicle controller 60 maintains the current drive mode and performs the process from step S35.

Figure 12:
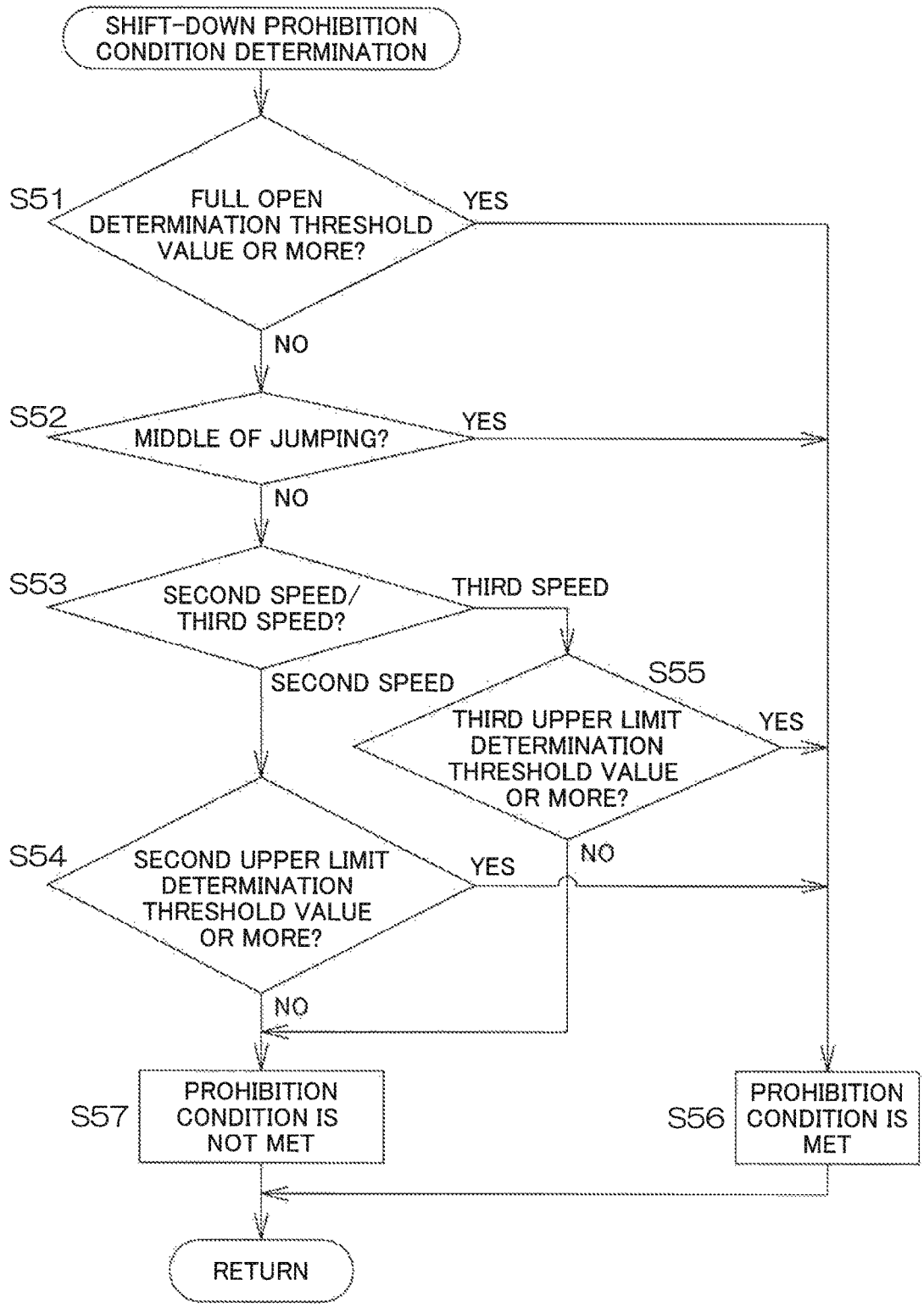
FIG. 12 is a flowchart illustrating an example of a shift-down prohibition condition determination (step S28 in FIG. 10 and step S41 in FIG. 11).

FIG. 12 is a flowchart illustrating an example of a shift-down prohibition condition determination (step S28 in FIG. 10 and step S41 in FIG. 11). In this example, the shift-down prohibition condition includes a condition in which the accelerator opening degree is a fully open determination threshold value (step S51). The shift-down prohibition condition further includes a condition in which the electric vehicle 1 is jumping (step S52). The shift-down prohibition condition further includes a condition in which the rotational speed of the electric motor 11 is equal to or more than an upper limit determination threshold value corresponding to the current drive mode (steps S53 to S55). That is, when the current drive mode is the second speed mode (step S53: Second speed), a condition in which the rotational speed of the electric motor 11 is equal to or more than a second upper limit determination threshold value (step S54) is one of the shift-down prohibition conditions. When the current drive mode is the third speed mode (step S53: Third speed), a condition in which the rotational speed of the electric motor 11 is equal to or more than a third upper limit determination threshold value (step S55) is one of the shift-down prohibition conditions.

The vehicle controller 60 determines whether or not the shift-down prohibition conditions (steps S51, S52, S54, and S55) are met. When any one of the shift-down prohibition conditions is met, the vehicle controller 60 determines that the shift-down prohibition condition is met (step S56). On the other hand, when every one of the shift-down prohibition conditions is not met, the vehicle controller 60 determines that the shift-down prohibition condition is not met (step S57).

Among the shift-down prohibition conditions, the condition in which the accelerator opening degree is equal to or more than the upper limit determination threshold value (step S51) is an example of a prohibited accelerator-opening-degree condition. In this case, the fully open determination threshold value is equal to or less than 100% (fully opened accelerator), and may be 100%. The fully open determination threshold value does not need to be 100%, and is preferably set to around 100% such that the fully open determination threshold value is a predetermined value (for example, a value of 90% or more) which can be substantially regarded as the accelerator opening degree.

Among the shift-down prohibition conditions, the condition in which the rotational speed of the electric motor 11 is equal to or more than the upper limit determination threshold value corresponding to the current drive mode (steps S53 to S55) is an example of a prohibited rotational speed condition. The second upper limit determination threshold value is equal to or less than the second upper limit rotational speed UL2 in the second speed mode, and may be equal to the second upper limit rotational speed UL2. Similarly, the third upper limit determination threshold value is equal to or less than the third upper limit rotational speed UL3 in the third speed mode, and may be equal to the third upper limit rotational speed UL3. The upper limit determination threshold values do not need to be set equal to the upper limit numbers of revolutions UL2 and UL3, and may be values around the upper limit numbers of revolutions (for example, close to a value of the upper limit rotational speed −200 rpm). The upper limit determination threshold value may be a value which is set with reference to the upper limit rotational speed in one lower speed change mode. For example, the second upper limit determination threshold value may be set equal or substantially equal to the first upper limit rotational speed UL1 in the first speed mode or may be a value around the first upper limit rotational speed (for example, about a value of the first upper limit rotational speed UL1+200 rpm). Similarly, the third upper limit determination threshold value may be set equal to the second upper limit rotational speed UL2 in the second speed mode or may be a value around the second upper limit rotational speed (for example, about a value of the second upper limit rotational speed UL2+200 rpm).

A determination as to whether or not the electric vehicle 1 is jumping may be performed such as by checking whether or not the output of the accelerator sensor 55 incorporated in the electric vehicle 1 is substantially zero. That is, when the accelerator sensor 55 detects a non-gravity state, the electric vehicle 1 is in a free falling state in the air, and thus it is possible to determine that the electric vehicle 1 is jumping. The determination as to whether or not the electric vehicle 1 is jumping may also be performed by using the output signal of a stroke sensor in a rear wheel suspension, the output signal of a gas pressure sensor that detects a gas pressure in the rear wheel suspension or the like.

In the second speed mode, the shift-down prohibition condition includes an accelerator opening degree condition (equal to or more than the fully open determination threshold value), the prohibited rotational speed condition (equal to or more than the second upper limit determination threshold value set to around the second upper limit rotational speed UL2), and a jump condition. These are examples of a first shift-down prohibition condition. The first shift-down prohibition condition may include only one of the accelerator opening degree condition, the prohibited rotational speed condition, and the jump condition, or may include arbitrary two combinations thereof.

In the third speed mode, the shift-down prohibition condition includes the accelerator opening degree condition (equal to or more than the fully open determination threshold value), the prohibited rotational speed condition (equal to or more than the third upper limit determination threshold value set to around the third upper limit rotational speed UL3), and the jump condition. These are examples of a second shift-down prohibition condition. The second shift-down prohibition condition may include only one of the accelerator opening degree condition, the prohibited rotational speed condition, and the jump condition, or may include arbitrary two combinations thereof.

Figure 13:
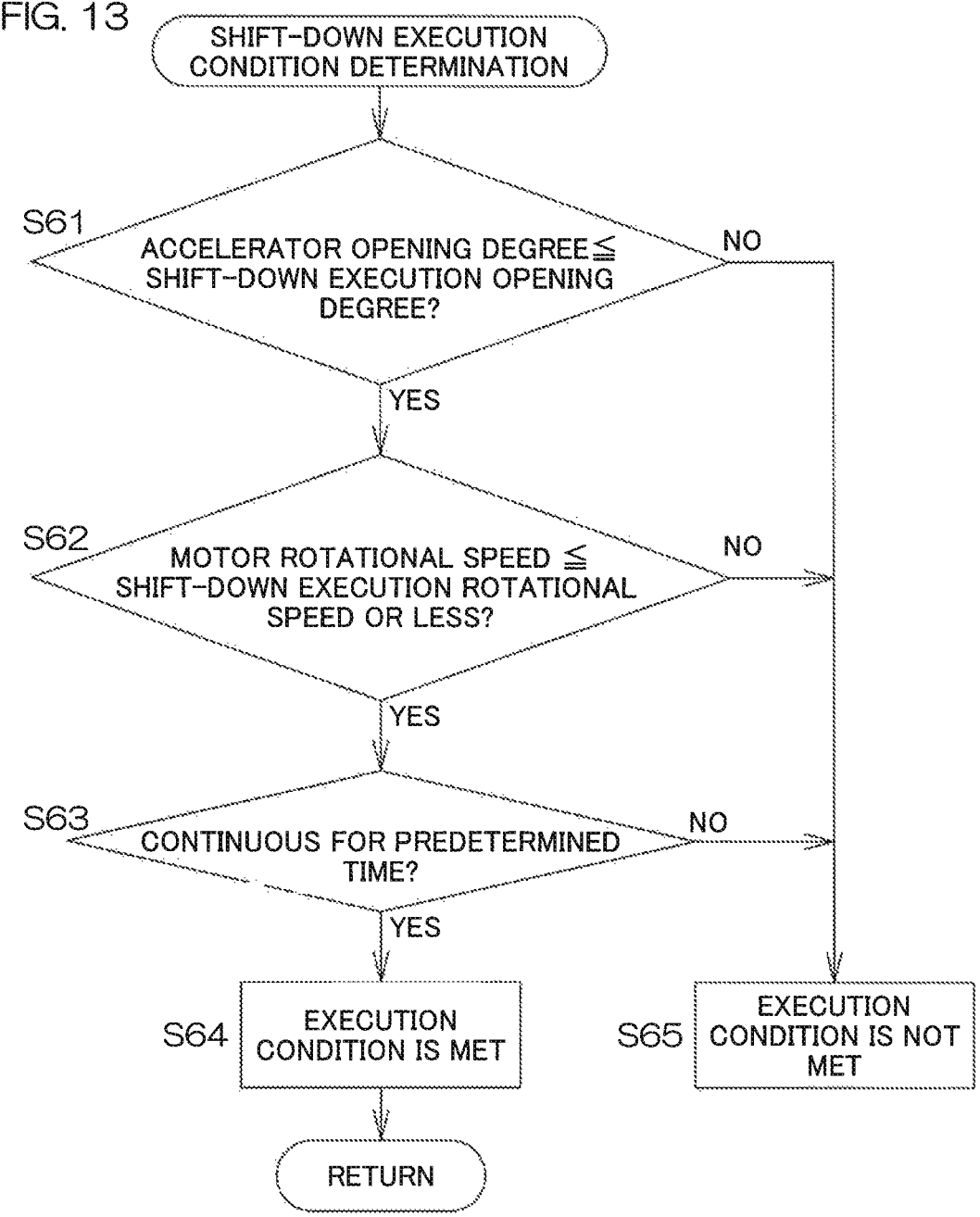
FIG. 13 is a flowchart illustrating an example of a shift-down execution condition determination (step S29 in FIG. 10 and step S42 in FIG. 11).

FIG. 13 is a flowchart illustrating an example of a shift-down execution condition determination (step S29 in FIG. 10 and step S42 of FIG. 11). In this example, the vehicle controller 60 determines whether or not the current accelerator opening degree is equal to or less than a predetermined shift-down execution opening degree (step S61. Execution accelerator-opening-degree condition). The shift-down execution opening degree is equal to or less than the above-described fully open determination threshold value and may be, for example, about 30%. The vehicle controller 60 determines whether or not the rotational speed of the electric motor 11 is equal to or less than a shift-down execution rotational speed (step S62. Execution rotational speed condition). For example, the shift-down execution rotational speed is equal to or less than the above-described upper limit determination threshold value, may be lower than the upper limit rotational speed in the drive mode after the shift down only by a predetermined value or may be a value higher than the upper limit rotational speed in the drive mode after the shift down only by a predetermined value. That is, when the current drive mode is the second speed mode, a value obtained by subtracting a first predetermined rotational speed from the first upper limit rotational speed may be set to the shift-down execution rotational speed or a value obtained by adding the first predetermined rotational speed to the first upper limit rotational speed may be set to the shift-down execution rotational speed. When the current drive mode is the third speed mode, a value obtained by subtracting a second predetermined rotational speed from the second upper limit rotational speed may be set to the shift-down execution rotational speed or a value obtained by adding the second predetermined rotational speed to the second upper limit rotational speed may be set to the shift-down execution rotational speed. In a case where the shift-down execution rotational speed is set to a value which is higher than the upper limit rotational speed in the drive mode after the shift down only by the predetermined value, the driving force characteristics at the time of the shift down may differ from the driving force characteristics at the time of the shift up.

The vehicle controller 60 determines whether or not a state where the execution accelerator-opening-degree condition (step S61) is met and where the execution rotational speed condition (step S62) is met continues for a predetermined time (for example, about one second) (step S63). When the determination is positive, the vehicle controller 60 determines that the shift-down execution condition is met (step S64). When any one of the determinations in steps S61, S62, and S63 is negative, the vehicle controller 60 determines that the shift-down execution condition is not met (step S65).

In a case where the execution accelerator-opening-degree condition (step S61) is not met, since the shift down is prohibited, the prohibited accelerator-opening-degree condition (step S51 in FIG. 12) is not always needed. Therefore, the prohibited accelerator-opening-degree condition (step S51 in FIG. 12) may be omitted. In this case, the determination on the execution accelerator-opening-degree condition (step S61) can also be substantially regarded as the determination on the prohibited accelerator-opening-degree condition. In a case where the execution rotational speed condition (step S62) is not met, since the shift down is prohibited, the prohibited rotational speed condition (steps S53 and S54 in FIG. 12) is not always needed. Therefore, the prohibited rotational speed condition may be omitted. In this case, the determination on the execution rotational speed condition (step S62) can also be substantially regarded as the determination on the prohibited rotational speed condition.

Furthermore, if the jump condition (step S52) is omitted from the shift-down prohibition condition, the shift-down prohibition condition (step S28 in FIG. 10 and step S41 in FIG. 11) may be omitted. In this case, the determination on the shift-down execution condition can also be substantially regarded as the determination on the shift-down prohibition condition. That is, in this case, the fact that the shift-down execution condition is met is equivalent to the fact that the shift-down prohibition condition is not met, and the fact that the shift-down execution condition is not met is equivalent to the fact that the shift-down prohibition condition is met.

Figure 14:
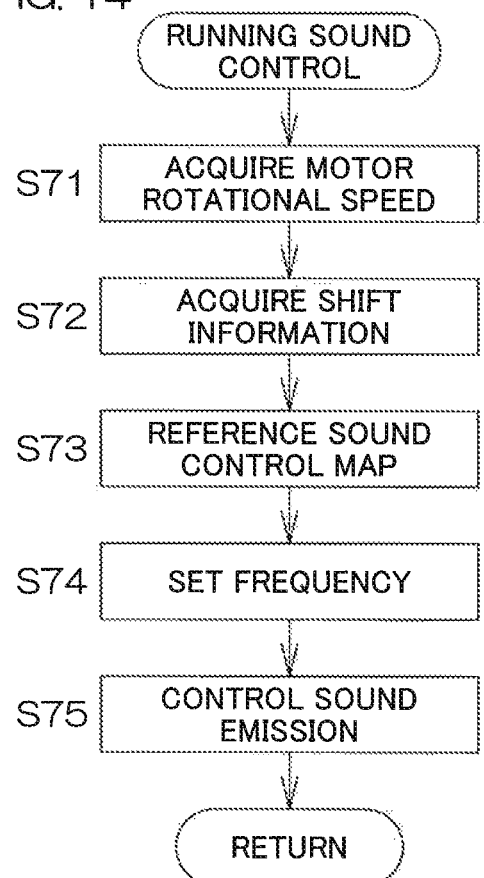
FIG. 14 is a flowchart illustrating an example of the control of a running sound performed by a sound controller.

FIG. 14 is a flowchart illustrating an example of the control of the running sound performed by the sound controller 65. The sound controller 65 acquires information on the rotational speed of the electric motor 11 from the vehicle controller 60 (step S71), and further acquires shift information indicating the current drive mode from the vehicle controller 60 (step S72). Based on the acquired information, the sound controller 65 references the sound control map 69 (step S73) so as to read a frequency corresponding to the current rotational speed of the electric motor 11 in the running sound characteristics corresponding to the current drive mode. The sound controller 65 sets the frequency to the frequency of the running sound (step S74), and drives, based on the frequency, the sound generator 27 so as to make the sound generator 27 emit the running sound (step S75). Thus, the running sound of the frequency corresponding to the drive mode and the rotational speed of the electric motor 11 is produced by the sound generator 27.

As described above, in this preferred embodiment, by operating the shift automatic/manual switch 47, the rider is able to select the shift-change mode from the automatic mode, the semi-automatic mode, and the manual mode. In the semi-automatic mode and the manual mode, the rider operates the accelerator grip 31 and to adjust the driving force of the electric motor 11, and operates the shift-up switch 45 to shift up the drive mode of the electric motor 11. The vehicle controller 60 changes the drive mode from the first speed mode to the second speed mode or from the second speed mode to the third speed mode in response to the operation of the shift-up switch 45. On the other hand, the vehicle controller 60 prohibits the shift down when the shift-down prohibition condition is met.

It is thus possible to appropriately perform or limit the shift down, and thus it is possible to prevent degradation of the riding comfort of the electric vehicle 1 caused by the shift down, with the result that it is possible to realize the vehicle characteristics of satisfactory riding comfort. Specifically, it is possible to realize the vehicle characteristics of satisfactory riding comfort for a user who is accustomed to a vehicle including an engine.

In this preferred embodiment, the shift-down prohibition condition includes the prohibited accelerator-opening-degree condition in which the accelerator opening degree is equal to or more than the predetermined fully open determination threshold value, the prohibited rotational speed condition in which the rotational speed of the electric motor 11 is equal to or more than the upper limit determination threshold value, and the jump condition in which the electric vehicle 1 is jumping.

When in the prohibited accelerator-opening-degree condition, the accelerator opening degree is equal to or more than the fully open determination threshold value, the shift down is prohibited. When the accelerator is fully opened or the accelerator opening degree is close thereto, the upper limit rotational speed of the electric motor 11 does not change. Therefore, in a state close to the fully opened accelerator, the rotational speed of the electric motor 11 does not decrease, and thus an unfamiliar running feeling is not provided to a user who is accustomed to a vehicle including an engine, with the result that it is possible to realize the vehicle characteristics of satisfactory riding comfort.

When in the prohibited rotational speed condition, the rotational speed of the electric motor 11 is equal to or more than the upper limit determination threshold value, the shift down is prohibited. When the rotational speed of the electric motor 11 is equal to or more than the upper limit determination threshold value, the accelerator may be regarded as the fully opened accelerator or as having the accelerator opening degree close thereto. Therefore, in the state close to the fully opened accelerator, the rotational speed of the electric motor 11 does not decrease, and thus an unfamiliar running feeling is not provided to a user who is accustomed to a vehicle including an engine, with the result that it is possible to realize the vehicle characteristics of satisfactory riding comfort.

Furthermore, when in the jump condition, the electric vehicle 1 is jumping, the shift down is prohibited. During jumping, the electric vehicle 1 performs a free movement in the air, and thus the vehicle speed is substantially equal to that before jumping. Therefore, after jumping is completed and the electric vehicle 1 lands, by keeping the same drive mode as before jumping, it is possible to provide the running characteristics of satisfactory riding comfort to the user.

In particular, in the semi-automatic mode, auto-shift down is performed according to the accelerator opening degree and the rotational speed of the electric motor 11, and thus it is beneficial to provide the jump condition. Otherwise, the rider needs to perform an operation of keeping the accelerator opening degree close to the fully opening even during jumping and maintain the drive mode. When the drive mode is automatically shifted down to the first speed mode without performing such an operation, the user needs to perform the shift-up operation after landing so as to return to the drive mode before jumping. When the accelerator opening degree is kept close to the fully opening in the air, the electric motor 11 rotates at a high speed, and accordingly, the rear wheel 8 rotates at a high speed, with the result that there is a possibility that it becomes difficult to control the posture of the electric vehicle 1 in the air.

In this preferred embodiment, when in the semi-automatic mode, the shift-down prohibition condition is not met, and the shift-down execution condition is met, the auto-shift down is performed. Accordingly, it is possible to appropriately perform the shift down without degradation of the riding comfort of the electric vehicle 1.

In this preferred embodiment, when in the manual mode, the shift-down command is input from the shift-down switch 46, the shift down is performed on condition that the shift-down prohibition condition is not met and that the shift-down execution condition is met. That is, even when the shift-down switch 46 is operated, only with that fact, the shift down is not performed. That is, it is necessary that the shift-down prohibition condition is not met and that the shift-down execution condition is met. Accordingly, even in a case where the rider performs the shift-down operation, the shift down is performed under the appropriate conditions. It is thus possible to improve riding comfort at the time of the shift down.

Furthermore, in this preferred embodiment, when in the manual mode, the shift-down command is input from the shift-down switch 46, in a case where the shift-down prohibition condition is met or the shift-down execution condition is not met, the receiving of the shift-down command is withheld. In this case, the vehicle controller 60 stands by until the shift-down prohibition condition is not met and the shift-down execution condition is met, and performs the shift down. Therefore, the rider does not need to perform the shift-down operation again. Thus, the rider is able to provide the shift-down command with arbitrary timing, and the actual shift down is performed under the appropriate conditions. It is thus possible to provide the electric vehicle 1 in which the shift-down operation is easily performed and in which satisfactory riding comfort is provided at the time of the shift down.

In this preferred embodiment, the shift-down execution condition includes the execution rotational speed condition in which the rotational speed of the electric motor 11 is equal to or less than the shift-down execution rotational speed set equal to or less than the upper limit rotational speed in the current drive mode (more preferably, equal to or less than the upper limit rotational speed in the drive mode after the shift down). That is, the shift down is not allowed until the rotational speed of the electric motor 11 is equal to or less than the shift-down execution rotational speed. Therefore, the condition in which the shift down is allowed is that a difference between the rotational speed of the electric motor 11 and the upper limit rotational speed in the drive mode after the shift down is small or the difference is equal to or less than the upper limit rotational speed. The rotational speed of the electric motor 11 does not significantly decrease due to the shift down, and thus it is possible to provide the electric vehicle 1 in which satisfactory riding comfort is provided at the time of the shift down.

In this preferred embodiment, the shift-down execution condition includes the execution accelerator-opening-degree condition in which the accelerator opening degree is equal to or less than the shift-down execution opening degree that is equal to or less than the fully open determination threshold value. Therefore, the shift down is not allowed until the accelerator opening degree is equal to or less than the shift-down execution opening degree. In other words, the shift down is allowed when the accelerator opening degree is small to some degree, and accordingly, a difference between the rotational speed of the electric motor 11 and the first upper limit rotational speed is small or the difference is equal to or less than the upper limit rotational speed in the drive mode after the shift down. The rotational speed of the electric motor 11 thus does not significantly decrease due to the shift down, and thus it is possible to provide the electric vehicle 1 in which satisfactory riding comfort is provided at the time of the shift down.

In this preferred embodiment, the shift-down execution condition includes the condition in which the execution rotational speed condition and the execution accelerator-opening-degree condition are met continuously for a predetermined time. The shift down is thus allowed when the accelerator is not fully opened and the rotational speed of the electric motor 11 is close to the upper limit rotational speed in the drive mode after the shift down or is stable in a state where the rotational speed of the electric motor 11 is equal to or less than the upper limit rotational speed. Therefore, it is possible to reliably prevent a significant decrease in the rotational speed of the electric motor 11 associated with the shift down, and thus it is possible to provide the electric vehicle 1 in which riding comfort at the time of the shift down is enhanced.

When the electric vehicle 1 is decelerated, the rider normally performs an operation of decreasing the rotational speed of the electric motor 11 by loosening the accelerator or performing a brake operation. Therefore, the shift down is performed when at least one of the execution rotational speed condition and the execution accelerator-opening-degree condition is met, and thus it is possible to realize pseudo speed change control that matches the riding feeling of the rider.

In this preferred embodiment, the drive torque command value characteristic lines LD1, LD2, and LD3 in the first speed mode, the second speed mode, and the third speed mode overlap each other in the low speed zone LSZ, and thus the low speed zone LSZ is the common characteristics zone. Therefore, as the rotational speed of the electric motor 11 decreases, the driving force characteristics in the first to third speed modes are approximated, with the result that it is possible to reduce or prevent changes in the driving force characteristics associated with the shift down. In particular, in this preferred embodiment, the shift-down prohibition condition includes the prohibition rotational speed condition, and thus the shift down is prohibited in the rotational speed zone where a large gap is present between the drive torque command value characteristics. The shift down is thus performed in the common characteristics zone or the rotational speed zone close thereto. Therefore, it is possible to further enhance riding comfort at the time of the shift down.

Furthermore, in this preferred embodiment, due to the function of the sound controller 65, the running sound corresponding to the drive mode and the rotational speed of the electric motor 11 is produced from the sound generator 27. The rider is thus able to perform the accelerator operation and the shift-change operation while recognizing the drive mode and the rotational speed of the electric motor 11. Therefore, the accelerator operation and the shift-change operation are appropriately performed, and thus it is possible to provide the electric vehicle 1 which is easy to operate and which has satisfactory riding comfort. In particular, it is possible to know changes in the rotational speed of the electric motor 11 through hearing while the electric vehicle 1 is running at an extremely low speed, and by finely adjusting the accelerator based on such changes, it is possible to easily obtain a vehicle behavior which is intended by the rider.

In the first upper limit rotational speed UL1, the running sound corresponding to the first running sound characteristic line LS1 and the running sound corresponding to the second running sound characteristic line LS2 differ from each other. Also, in the second upper limit rotational speed UL2, the running sound corresponding to the second running sound characteristic line LS2 and the running sound corresponding to the third running sound characteristic line LS3 differ from each other. The different running sounds are thus produced according to the first speed mode, the second speed mode, and the third speed mode, and thus the rider is able to reliably recognize the current drive mode, with the result that the accelerator operation and the shift-change operation are appropriately and easily performed. Accordingly, it is possible to provide the electric vehicle 1 which is easy to operate and which has satisfactory riding comfort.

Moreover, when the drive mode is changed, the running sound characteristic lines to be referenced are switched, and accordingly, the running sound is changed discontinuously. Therefore, the rider is able to easily recognize the switching of the drive modes. That is, the rider is able to recognize the current state of the electric vehicle 1 in a timely manner, and thus it is possible to provide the electric vehicle 1 which is easy to operate and which has satisfactory riding comfort. In particular, in a case where the shift change is automatically performed, the running sound is changed discontinuously, and thus the rider is able to clearly recognize the change of the drive modes, with the result that the rider appropriately operates the electric vehicle 1. For example, when in the above-described semi-automatic mode, the auto-shift down is performed, the rider recognizes such auto-shift down through hearing and is able to know the current drive mode. It is thus possible to perform the accelerator operation while recognizing the drive mode when accelerating the electric vehicle 1 again, and thus it is possible to achieve the optimum acceleration.

In this preferred embodiment, the running sound characteristic lines LS1 to LS3 define the characteristics in which the frequency serving as one piece of the elemental data of the running sound is changed according to the rotational speed of the electric motor 11. In the first running sound characteristic line LS1, the frequency corresponding to the first upper limit rotational speed UL1 is the maximum frequency Fmax. In the second running sound characteristic line LS2, the frequency corresponding to the second upper limit rotational speed UL2 is the maximum frequency Fmax. In the third running sound characteristic line LS3, the frequency corresponding to the third upper limit rotational speed UL3 is the maximum frequency Fmax. The running sound data shares the common elemental data, that is, the maximum frequency Fmax in the first upper limit rotational speed, the second upper limit rotational speed, and the third upper limit rotational speed, and thus the rider easily recognizes the upper limit rotational speed in each drive mode. That is, when in each drive mode, the running sound that has the maximum frequency Fmax which is the common elemental data is produced, the rider is able to recognize that the upper limit rotational speed in the drive mode is reached. The rider thus appropriately and easily performs the accelerator operation and the shift change, and thus it is possible to provide the electric vehicle 1 which is easy to operate and which has satisfactory riding comfort.

In this preferred embodiment, the running sound characteristic lines LS1, LS2, and LS3 are determined such that as the rotational speed of the electric motor 11 increases, the predetermined elemental data, that is, the frequency increases. Therefore, in each drive mode, as the rotational speed of the electric motor 11 increases, the frequency increases, and when the upper limit rotational speed in each drive mode is reached, the frequency becomes the maximum frequency Fmax. Accordingly, the rider is able to recognize the rotational speed of the electric motor 11 from the running sound, and in particular, the rider is able to easily recognize that the upper limit rotational speed in each drive mode is reached. Therefore, the rider is able to appropriately perform the accelerator operation and the shift change. Thus, it is possible to provide the electric vehicle 1 which is easy to operate and which has satisfactory riding comfort.

In this preferred embodiment, in the running sound characteristic line LS1, the first upper limit rotational speed zone UZ1 set in the vicinity of the first upper limit rotational speed UL1, the frequency is saturated at the maximum frequency Fmax. Similarly, in the running sound characteristic line LS2, in the second upper limit rotational speed zone UZ2 set in the vicinity of the second upper limit rotational speed UL2, the frequency is saturated at the maximum frequency Fmax. Furthermore, similarly, in the running sound characteristic line LS3, in the third upper limit rotational speed zone UZ3 set in the vicinity of the third upper limit rotational speed UL3, the frequency is saturated at the maximum frequency Fmax. Accordingly, the rider is able to reliably recognize that the rotational speed of the electric motor 11 is close to the upper limit rotational speed in each drive mode. Therefore, the rider appropriately performs the accelerator operation and the shift change. Thus, it is possible to provide the electric vehicle 1 which is easy to operate and which has satisfactory riding comfort.

In addition, in this preferred embodiment, the driving force characteristic map 67 specifies not only the drive torque command value characteristic lines LD1, LD2, and LD3 serving as the power running characteristics which are applied when the electric motor 11 is accelerated but also the regeneration torque command value characteristic lines LR1, LR2, and LR3 which are applied when the electric motor 11 is decelerated. Therefore, when the electric motor 11 is accelerated, the torque command value is determined according to the drive torque command value characteristic lines LD1, LD2, and LD3 (power running characteristics) whereas when the electric motor 11 is decelerated, the torque command value is determined according to the regeneration torque command value characteristic lines LR1, LR2, and LR3 (regeneration characteristics). It is thus possible to appropriately perform the acceleration and the deceleration, and thus it is possible to provide the electric vehicle 1 which has satisfactory riding comfort. Also, when the shift-down prohibition condition is met, the shift down is prohibited. The shift down is thus appropriately performed, and thus it is possible to provide the electric vehicle 1 which has satisfactory riding comfort when the electric motor 11 is decelerated, that is, even when the regeneration operation is performed.

In this preferred embodiment, in the zone where the rotational speed of the electric motor 11 to which the common regeneration torque command value characteristic line LRC is applied is exceeded, at an arbitrary rotational speed of the electric motor 11, the regeneration force in the first speed mode is larger than that in the second speed mode, and the regeneration force in the second speed mode is larger than that in the third speed mode. In this preferred embodiment, the shift down is limited by the shift-down prohibition condition, and thus it is possible to prevent an abrupt increase in the degree of deceleration due to a rapid increase in regeneration force due to the shift down. It is thus possible to provide the electric vehicle 1 which has satisfactory riding comfort.

Even in the regeneration operation, the running sound is produced according to the sound control map 69. Even at the time of the regeneration, the running sound corresponding to the drive mode is produced, and thus the rider is able to know the current drive mode through hearing. Also, when the shift down is performed, the running sound is accordingly changed discontinuously, with the result that the rider is able to recognize, through hearing, that the shift down is performed.

In addition, in this preferred embodiment, the clutch 10 is provided which includes a mechanical clutch that connects/blocks the driving force transmission path between the electric motor 11 and the rear wheel 8. The clutch 10 is operated according to the operation of the clutch lever 41 performed by the rider. Therefore, the rider operates the clutch lever 41 to operate the clutch 10, and thus selects the use/stop of the driving force of the electric motor 11. The degree of freedom of operating is thus enhanced, and thus it is possible to provide the electric vehicle 1 which is easy to operate and which has satisfactory riding comfort accordingly. In particular, the running sound corresponding to the rotational speed of the electric motor 11 and the drive mode is produced, and thus it is possible to appropriately perform the clutch connection operation and the shift change, with the result that it is possible to provide the electric vehicle 1 which is easy to operate and which has satisfactory riding comfort accordingly.

In addition, in this preferred embodiment, when the electric vehicle 1 is in a stopped state in which the electric vehicle 1 is stopped in a state where the electric vehicle 1 is turned on and able to run, that is, when the rotational speed of the electric motor 11 is zero, an idling sound (the idling frequency Fi) is produced, and thus it is possible to transmit to the rider, through hearing, that the electric vehicle 1 is in a state where the electric vehicle 1 is able to start. The rider thus recognizes that the electric vehicle 1 is in the state where the electric vehicle 1 is able to start without looking at any meters, an indicator or the like, with the result that it is possible to provide the electric vehicle 1 which is easy to operate.

The "state where the electric vehicle 1 is able to run" refers to a state which is a so-called standby state and in which it is possible to start the running of the electric vehicle 1 by the start operation by the operator (specifically, the operation of turning the accelerator grip 31). More specifically, the "state where the electric vehicle 1 is able to run" refers to a state where the vehicle controller 60 drives the electric motor 11 in response to the start operation by the rider.

When the rotational speed of the electric motor 11 is zero, the electric motor 11 itself does not produce a mechanical sound, and thus the rider has difficulty in knowing the state of the electric vehicle 1 through hearing. In such a case, by producing the idling sound from the sound generator 27, it is possible to transmit the state in which the electric vehicle 1 is able to start to the rider through hearing.

Although preferred embodiments of the present invention have been described above, other preferred embodiments of the present invention can be carried out.

For example, although in the preferred embodiments described above, an electric motorcycle whose drive wheel is the rear wheel is disclosed, the drive wheel may be the front wheel, or may be both the front wheel and the rear wheel. The electric motorcycle is an example of a straddled electric vehicle, and an electric three-wheeled vehicle such as a rough terrain running vehicle, an electric four-wheeled vehicle and the like are also included in the category of the straddled electric vehicle. The present invention can also be applied to electric vehicles other than a straddled electric vehicle.

Also, in the preferred embodiments described above, the vehicle controller 60 preferably performs the electric motor control, and the sound controller 65 preferably performs the running sound control. However, the functions of the vehicle controller 60 and the sound controller 65 may be realized with one electronic control unit (ECU).

Also, in the preferred embodiments described above, the automatic mode, the semi-automatic mode, and the manual mode are preferably selected as the shift-change mode. However, it may be such that only two modes of the automatic mode and the semi-automatic mode are selected. Also, it may be such that only two modes of the automatic mode and the manual mode are selected. Furthermore, it may be such that only two modes of the semi-automatic mode and the manual mode are selected. Still further, the shift-change mode does not need to be able to be selected, and the electric vehicle 1 may be arranged such that the electric vehicle 1 may be operated only in one of the automatic mode, the semi-automatic mode, and the manual mode described above.

Also, in the preferred embodiments described above, as a variable elemental data of the running sound, frequency is disclosed. However, as the variable elemental data of the running sound, not only the frequency (pitch) but also the volume (amplitude), the sound quality and the sound emission pattern (the sound emission interval of the same sound, the pattern of change of sound and the like) may be used. The running sound characteristics are preferably determined such that at least one of these pieces of the elemental data is changed according to the rotational speed of the electric motor.

Also, in the preferred embodiments described above, the drive torque command value characteristics and the regeneration torque command value characteristics are preferably stored in advance in the driving force characteristic map 67, and the torque command value is generated according to these characteristics. However, instead of using the driving force characteristic map 67, the torque command value may be determined by a computation using a calculation formula in which the torque command value characteristics in the respective drive modes are approximated.

Also, in the preferred embodiments described above, the running sound characteristics are preferably stored in advance in the sound control map 69, and the running sound is produced according to these characteristics. However, instead of using the sound control map 69, the elemental data (such as the frequency) of the running sound may be determined by a computation using a calculation formula in which the running sound characteristics in the respective drive modes are approximated.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:
1. An electric vehicle comprising:
   front and rear wheels;
   a battery;

an electric motor that uses power supplied from the battery to drive at least one of the front and rear wheels;

an accelerator that is operated by a user to adjust a driving force of the electric motor;

a mode shift operator that is operated by the user to switch among a plurality of drive modes each having a different upper limit rotational speed of the electric motor, the plurality of drive modes including a first drive mode in which a first upper limit rotational speed is set and a second drive mode in which a second upper limit rotational speed larger than the first upper limit rotational speed is set;

a driving force characteristics setter that sets, for each of the plurality of drive modes, driving force characteristics including a target drive force with respect to an accelerator opening degree that is an amount of operation of the accelerator and the rotational speed of the electric motor; and a controller configured or programmed to shift up, according to an operation of the mode shift operator, the drive mode of the electric motor from the first drive mode to the second drive mode, to acquire the accelerator opening degree and the rotational speed of the electric motor, to control the target drive force according to the driving force characteristics set by the driving force characteristics setter, and to prohibit, when a first shift-down prohibition condition is met, a shift down from the second drive mode to the first drive mode.

2. The electric vehicle according to claim 1, wherein the first shift-down prohibition condition includes at least one of a prohibited accelerator-opening-degree condition in which the accelerator opening degree is equal to or more than a fully open determination threshold value, a prohibited rotational speed condition in which the rotational speed of the electric motor is equal to or more than a predetermined upper limit determination threshold value, and a jump condition in which the electric vehicle is jumping.

3. The electric vehicle according to claim 1, wherein, when in the second drive mode and the first shift-down prohibition condition is not met and a shift-down execution condition is met, the controller is configured or programmed to perform the shift down from the second drive mode to the first drive mode.

4. The electric vehicle according to claim 1, wherein, when in the second drive mode and a shift-down command to shift down to the first drive mode with the mode shift operator is input on a condition that the first shift-down prohibition condition is not met and that a shift-down execution condition is met, the controller is configured or programmed to perform the shift down from the second drive mode to the first drive mode.

5. The electric vehicle according to claim 4, wherein, when in the second drive mode and the shift-down command to shift down to the first drive mode with the mode shift operator is input and the first shift-down prohibition condition is met or the shift-down execution condition is not met, the controller is configured or programmed to withhold receiving the shift-down command and to stand by until the shift-down prohibition condition is not met and the shift-down execution condition is met.

6. The electric vehicle according to claim 3, wherein the shift-down execution condition includes an execution rotational speed condition in which the rotational speed of the electric motor is equal to or less than a shift-down execution rotational speed that is equal to or less than the second upper limit rotational speed.

7. The electric vehicle according to claim 3, wherein the shift-down execution condition includes an execution accelerator-opening-degree condition in which the accelerator opening degree is equal to or less than a shift-down execution opening degree that is equal to or less than the fully open determination threshold value.

8. The electric vehicle according to claim 3, wherein the shift-down execution condition includes a condition in which an execution rotational speed condition in which the rotational speed of the electric motor is equal to or less than a shift-down execution rotational speed that is equal to or less than the second upper limit rotational speed and an execution accelerator-opening-degree condition in which the accelerator opening degree is equal to or less than a shift-down execution opening degree that is equal to or less than the fully open determination threshold value are met continuously for a predetermined time.

9. The electric vehicle according to claim 1, wherein the driving force characteristics of the first drive mode and the second drive mode include a common characteristics zone in which equal characteristics are set in a low speed zone lower than the first upper limit rotational speed.

10. The electric vehicle according to claim 1, wherein the plurality of drive modes further include a third drive mode in which a third upper limit rotational speed larger than the second upper limit rotational speed is set; and the controller is configured or programmed to shift up, according to the operation of the mode shift operator, the drive mode of the electric motor from the second drive mode to the third drive mode, and to prohibit a shift down from the third drive mode to the second drive mode when a second shift-down prohibition condition is met.

11. The electric vehicle according to claim 1, further comprising:

a shift input acceptance/rejection operator that is operated by the user to switch between a state in which a shift command input by the mode shift operator is enabled and a state in which the shift command input by the mode shift operator is disabled.

12. The electric vehicle according to claim 1, further comprising:

a running sound characteristics setter that sets a plurality of running sound characteristics including a running sound for the rotational speed of the electric motor according to the plurality of drive modes, and the plurality of running sound characteristics include first running sound characteristics corresponding to the first drive mode and second running sound characteristics corresponding to the second drive mode that is different from the first running sound characteristics;

a running sound generator that produces a running sound; and a running sound controller configured or programmed to control the running sound generator according to the running sound characteristics corresponding to the drive mode among the plurality of running sound characteristics set by the running sound characteristics setter and the rotational speed of the electric motor, and to cause the running sound generator to emit a sound.

13. The electric vehicle according to claim 12, wherein, in the first upper limit rotational speed, the running sound corresponding to the first running sound characteristics and the running sound corresponding to the second running sound characteristics are different from each other.

14. The electric vehicle according to claim 13, wherein the plurality of drive modes further include a third drive mode in which a third upper limit rotational speed larger than the second upper limit rotational speed is set;

the plurality of running sound characteristics set by the running sound characteristics setter include third running sound characteristics that correspond to the third drive mode and that are different from both the first running sound characteristics and the second running sound characteristics; and in the first upper limit rotational speed, the running sound corresponding to the third running sound characteristics is different from both the running sound corresponding to the first running sound characteristics and the running sound corresponding to the second running sound characteristics.

15. The electric vehicle according to claim 12, wherein the running sound controller is configured or programmed to control the running sound generator such that when the drive mode is changed, the running sound is changed discontinuously according to switching of the plurality of drive modes.

16. The electric vehicle according to claim 12, wherein the running sound characteristics include, for predetermined elemental data of the running sound, a characteristic that changes according to the rotational speed of the electric motor; and the elemental data corresponding to the first upper limit rotational speed in the first running sound characteristics and the elemental data corresponding to the second upper limit rotational speed in the second running sound characteristics are equal or substantially equal to each other.

17. The electric vehicle according to claim 16, wherein the running sound characteristics are determined such that the predetermined elemental data increases as the rotational speed of the electric motor increases.

18. The electric vehicle according to claim 17, wherein, in the first running sound characteristics and a first upper limit rotational speed zone set in a vicinity of the first upper limit rotational speed, the elemental data is saturated at a maximum value; and in the second running sound characteristics and a second upper limit rotational speed zone set in a vicinity of the second upper limit rotational speed, the elemental data is saturated at the maximum value.

19. The electric vehicle according to claim 1, wherein the driving force characteristics set by the driving force characteristics setter for each of the plurality of drive modes include power running characteristics that are applied when the electric motor is accelerated and regeneration characteristics that are applied when the electric motor is decelerated, and the regeneration characteristics are characteristics that determine a target regeneration force corresponding to the rotational speed of the electric motor as a target motor driving force.

20. The electric vehicle according to claim 19, wherein the regeneration characteristics for the first drive mode and the second drive mode are predetermined such that, at an arbitrary rotational speed of the electric motor within a predetermined rotational speed zone, a regeneration force in the first drive mode becomes larger than a regeneration force in the second drive mode.

21. The electric vehicle according to claim 1, further comprising:

a mechanical clutch that connects/blocks a driving force transmission path between the electric motor and the front and rear wheels; and a clutch operator that is operated by the user in order to operate the mechanical clutch.

* * * * *